United States Patent
Shao

(10) Patent No.: US 8,411,200 B2
(45) Date of Patent: Apr. 2, 2013

(54) VIDEO SIGNAL PROCESSING DEVICE, METHOD, AND NON-TRANSITORY COMPUTER READABLE MEDIUM STORING IMAGE PROCESSING PROGRAM CAPABLE OF PRODUCING AN APPROPRIATE INTERPOLATION FRAME

(75) Inventor: Ming Shao, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 179 days.

(21) Appl. No.: 12/965,315

(22) Filed: Dec. 10, 2010

(65) Prior Publication Data

US 2011/0141369 A1  Jun. 16, 2011

(30) Foreign Application Priority Data

Dec. 11, 2009  (JP) .................................. 2009-281493

(51) Int. Cl.
*H04N 7/01*  (2006.01)
*H04N 11/20*  (2006.01)

(52) U.S. Cl. .......................... 348/441; 348/701; 348/452

(58) Field of Classification Search .................. 348/441, 348/448, 458, 452, 459, 700, 701, 618–620; 382/298–300, 275

See application file for complete search history.

(56) References Cited

U.S. PATENT DOCUMENTS

| | | | | |
|---|---|---|---|---|
| 6,900,846 | B2 * | 5/2005 | Lee et al. ....................... | 348/459 |
| 7,769,089 | B1 * | 8/2010 | Chou ........................ | 375/240.29 |
| 2005/0025342 | A1 * | 2/2005 | Lee et al. ....................... | 382/107 |
| 2006/0092321 | A1 * | 5/2006 | Ogino et al. ................... | 348/441 |
| 2006/0188022 | A1 * | 8/2006 | Lee et al. ................... | 375/240.17 |
| 2007/0160145 | A1 * | 7/2007 | Kwon et al. .............. | 375/240.16 |
| 2007/0237234 | A1 * | 10/2007 | Lidberg ................... | 375/240.16 |
| 2008/0204592 | A1 * | 8/2008 | Jia et al. ....................... | 348/402.1 |
| 2009/0161010 | A1 * | 6/2009 | Tran et al. ..................... | 348/441 |
| 2009/0324115 | A1 * | 12/2009 | Myaskouvskey et al. .... | 382/236 |
| 2010/0266041 | A1 * | 10/2010 | Gish et al. ................ | 375/240.15 |
| 2010/0283892 | A1 * | 11/2010 | Zhou et al. .................... | 348/441 |

FOREIGN PATENT DOCUMENTS

| | | | |
|---|---|---|---|
| JP | 2006-304266 A | 11/2006 |
| JP | 2008-118505 A | 5/2009 |
| JP | 2010-124193 A | 6/2010 |

* cited by examiner

*Primary Examiner* — Victor Kostak

(74) *Attorney, Agent, or Firm* — Sughrue Mion, PLLC

(57) ABSTRACT

A video signal processing device includes: a correction unit which performs correction such that when a first frame to be displayed at a first time includes a pixel different from a pixel to be included in the first frame, the pixel different from the pixel to be included in the first frame is corrected to the pixel to be included in the first frame, and when a second frame to be displayed at a second time prior to the first time includes a pixel different from a pixel to be included in the second frame, the pixel different from the pixel to be included in the second frame is corrected to the pixel to be included in the second frame; and a motion compensation unit which generates an interpolation frame to be displayed at a time between the first and second times by referring to the first and second frames.

15 Claims, 12 Drawing Sheets

VIDEO SIGNAL PROCESSING DEVICE, METHOD, AND NON-TRANSITORY COMPUTER READABLE MEDIUM STORING IMAGE PROCESSING PROGRAM CAPABLE OF PRODUCING AN APPROPRIATE INTERPOLATION FRAME

INCORPORATION BY REFERENCE

This application is based upon and claims the benefit of priority from Japanese patent application No. 2009-281493, filed on Dec. 11, 2009, the disclosure of which is incorporated herein in its entirety by reference.

BACKGROUND

1. Field of the Invention

The present invention relates to a video signal processing device, a video signal processing method, and a non-transitory computer readable medium storing a video signal processing program. In particular, the present invention relates to a video signal processing device, a video signal processing method, and a non-transitory computer readable medium storing a video signal processing program for performing motion estimation and motion compensation of a video signal to be input.

2. Description of Related Art

Japanese Unexamined Patent Application Publication No. 2008-118505 discloses a technique relating to a frame rate converter (FRC) of motion compensation type. Frame rate conversion is a technique used to generate an interpolation frame to be displayed between one frame and another frame displayed subsequent to the one frame in a moving image, based on these frames. The frame rate conversion technique produces an effect that a target motion in a moving image to be displayed can be reproduced more smoothly by generating an interpolation frame to be inserted between frames. In this regard, Japanese Unexamined Patent Application Publication No. 2008-118505 discloses a technique relating to an image displaying device or the like for suppressing a disturbance or distortion of an insertion image in the vicinity of an effective image edge portion such as an edge portion of a screen caused by the frame rate conversion processing of motion compensation type. The image displaying device disclosed in Japanese Unexamined Patent Application Publication No. 2008-118505 includes a motion vector detection circuit for detecting a motion vector of an input image signal, an effective image edge portion judging circuit for judging if a motion vector detecting position is adjacent to the effective image edge portion, and a vector switching circuit for switching a vector in accordance with the judging result of the effective image edge portion judging circuit. The vector switching circuit fixes the vector to 0 vector in the case where the motion vector detecting position is adjacent to the effective image edge portion. In the case where the position is in other region, the vector switching circuit outputs the motion vector detected by the motion vector detection circuit to an insertion vector allocation circuit.

Japanese Unexamined Patent Application Publication No. 2006-304266 discloses a technique relating to a frame rate conversion processing device capable of obtaining a smooth reproduced image. The frame rate conversion processing device disclosed in Japanese Unexamined Patent Application Publication No. 2006-304266 includes pan/tilt determining means which determines whether an image is in a pan/tilt state on the basis of information related to motion of the image detected by motion detecting means for each frame of a moving image, moving distance setting means which sets 0 as a moving distance of an image with respect to a frame the image of which is not determined as an image in a pan/tilt state by the pan/tilt determining means, which calculates a moving distance of an image from the information related to the motion of the image detected by the motion detecting means with respect to a frame the image of which is determined as an image in a pan/tilt state, and which sets the obtained moving distance as a moving distance of the image, and prediction image generating means which generates a prediction image necessary for frame rate conversion on the basis of the moving distance of the image set for each frame by the moving distance setting means.

As for display modes of display devices such as television sets and monitors, there are two modes, i.e., progressive and interlace. Further, progressive signals and interlaced signals are used as video signal formats corresponding to these display modes. Note that a related application by the same inventor is Japanese Unexamined Patent Application Publication No. 2010-124193, which relates to IP (Interlace-Progressive) conversion.

SUMMARY

The present inventor has found a problem that in the frame rate conversion disclosed in Japanese Unexamined Patent Application Publication Nos. 2008-118505 and 2006-304266, when motion compensation is performed on the input video signal that has been incorrectly converted, the effect of the incorrect conversion becomes more significant. Frame rate conversion is a technique that generates an interpolation frame to be inserted between a plurality of frames including an input video signal, based on the plurality of frames. More specifically, in the frame rate conversion, basically, pixels forming the plurality of frames to be referred to are correlated with each other by a motion vector, to thereby generate pixels forming an interpolation frame by using the pixels correlated with each other by the motion vector. Accordingly, if the plurality of frames to be referred to when an interpolation frame is generated has pixel information different from the original pixel information (e.g., a value representing brightness or the like of a given pixel) due to the effect of some processing in a stage prior to the frame rate conversion, the pixels of the interpolation frame to be generated by the frame rate conversion may include an erroneous pixel. This is because even when the pixels forming the frames to be referred to are correlated with each other by a motion vector, the pixels may be incorrectly correlated with each other by the motion vector, since the frames currently referred to include pixels different from the pixels to be included in the frames currently referred to. Thus, the interpolation frame is not formed of correct pixels, and a moving image to be displayed including the interpolation frame includes a larger number of erroneous images to be displayed. As a result, it is impossible to obtain the effect of the frame rate conversion that a target motion to be displayed is made smooth, and even worse, the quality of the original moving image may be deteriorated.

In the frame rate conversion disclosed in Japanese Unexamined Patent Application Publication Nos. 2008-118505 and 2006-304266, the input video signal is directly subjected to frame rate conversion. Thus, when a video signal that has been incorrectly converted is input, the incorrect state is inherited to an interpolation video signal which is a conversion result. Particularly when interpolation is performed on a progressive signal, which is obtained after IP conversion of an interlaced signal as an input signal, by frame rate conversion, the incorrect state due to the previous IP conversion becomes more significant in many cases. The IP conversion is a technique that interpolates a pixel to be included in a line missing in a received frame and sequentially outputs pixels (progressive signals) included in the top line of the interpolated frame, when only pixels (interlaced signals) included in odd-numbered lines or even-numbered lines of one frame are sequentially transmitted. The interpolation by the IP conversion, however, is not always carried out correctly. For instance, when information about pixels included in a line which is not missing is referred to so as to interpolate one pixel in a certain line, the pixel to be interpolated may be converted into a pixel having information (e.g., a value of a luminance signal or a color different signal) different from that of the correct pixel to be interpolated, depending on the information about the pixels to be referred to. When the frames to be referred to when the frame rate conversion is carried out include a frame including a pixel incorrectly interpolated by the IP conversion, the interpolation frame to be generated by the frame rate conversion includes a pixel generated based on the erroneous pixel. Such an interpolation frame interpolates a target motion different from that to be originally displayed. A moving image displayed in this case includes a larger number of frames displaying a target motion different from that to be originally displayed. As a result, it is impossible to obtain the effect that the target motion to be displayed is made smooth by the frame rate conversion, and even worse, the quality of a moving image to be displayed may be deteriorated.

Note that the above-mentioned problem arises not only in the frame rate conversion but also in an MJC (Movie Judder Cancellation) system which is another method for motion compensation processing.

According to the first to third exemplary aspects of the present invention, when at least two frames, i.e., the first and second frames to be referred to so as to generate an interpolation frame include a pixel different from a pixel to be originally included, correction is performed such that the different pixel is corrected to the pixel to be originally included. As a result, the frames to be referred to so as to form the interpolation frame are formed of correct pixels, and pixels forming the interpolation frame are properly generated. Consequently, the first to third exemplary aspects of the present invention can solve the above-mentioned problem inherent in the related art.

According to the exemplary aspects of the present invention, it is possible to provide a video signal processing device, a video signal processing method, and a non-transitory computer readable medium storing a video signal processing program that are capable of producing an appropriate interpolation frame.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
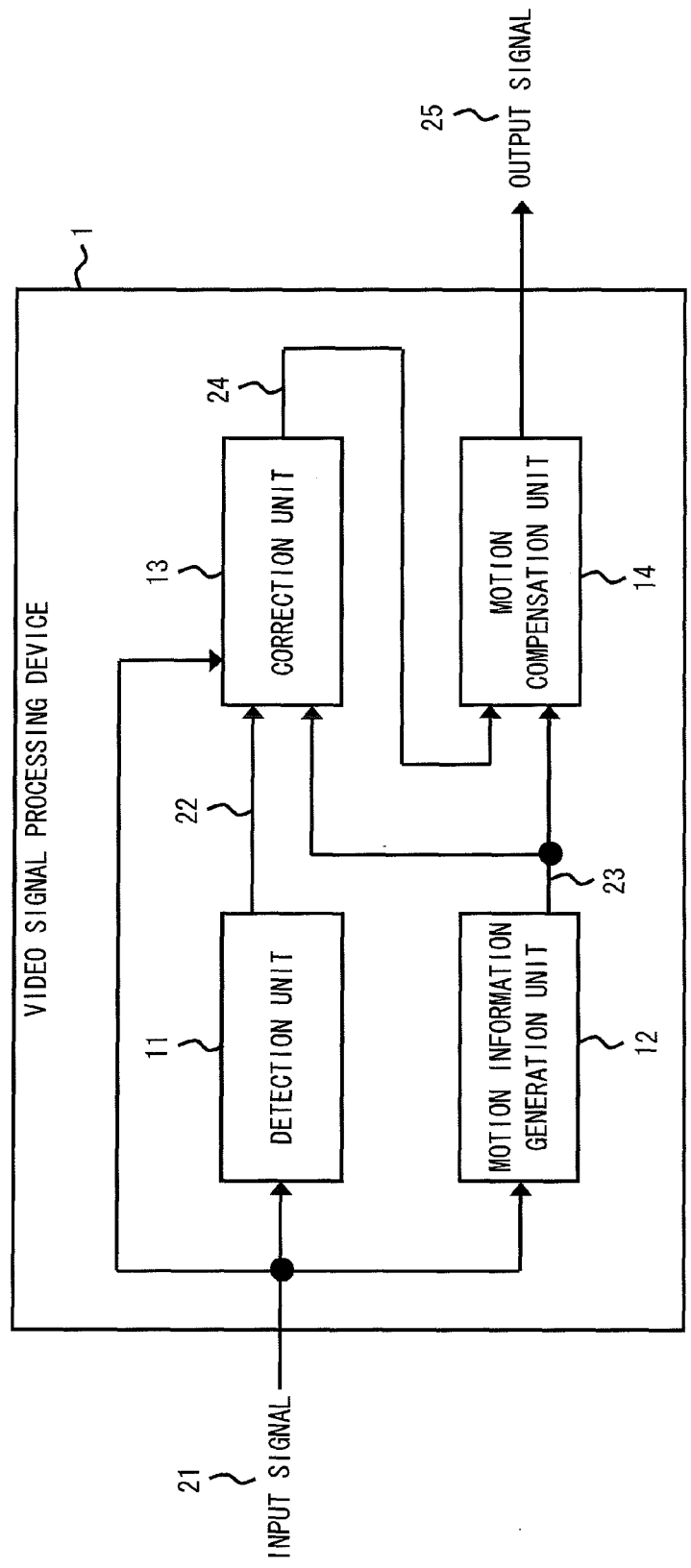
FIG. 1 is a block diagram showing an exemplary configuration of a video signal processing device according to a first exemplary embodiment of the present invention.

Exemplary embodiments of the present invention will be described in detail below with reference to the accompanying drawings. The same components are denoted by the same reference numerals throughout the drawings, and a repeated description thereof is omitted as appropriate.

[First Exemplary Embodiment]

FIG. 1 is a block diagram showing an exemplary configuration of a video signal processing device 1 according to a first exemplary embodiment of the present invention. The video signal processing device 1 includes a detection unit 11, a motion information generation unit 12, a correction unit 13, and a motion compensation unit 14.

The detection unit 11 detects an accuracy 22 of conversion performed before input of an input signal 21 which is an input video signal. Specifically, the input signal 21 is a moving image representing a motion to be displayed by sequentially displaying a plurality of frames in succession. The frames are sequentially input to the detection unit 11. After that, the detection unit 11 detects the accuracy of conversion in units of processing (e.g., a plurality of lines or entire frame) per frame. An example of the accuracy of conversion is a ratio of erroneous pixels, which are different from the correct pixels, to the entire pixels corresponding to the unit of processing, when conversion is executed in the pre-stage of the detection unit 11. There are various technical methods for determining an erroneous pixel. Examples of the methods include a method of comparing a frequency component of a luminance signal of each pixel included in one frame input to the detection unit 11 with a frequency component of a luminance signal of each peripheral pixel, thereby determining an erroneous pixel based on the similarity or correlation therebetween.

The motion information generation unit 12 generates motion information 23 related to a motion of an image from the input signal 21. A specific example of the motion information 23 is a motion vector. When it is determined which pixel of one frame input to the motion information generation unit 12 corresponds to which pixel of another frame input to the motion information generation unit 12 prior to the one frame, for instance, a vector connecting the coordinates of these pixels is used as a motion vector. For instance, this motion vector is determined such that pixels included in the corresponding processing unit (e.g., a plurality of lines) are extracted from two frames, and the motion vector is determined within the range of the extracted pixels. In determining motion vectors, the pixels included in one frame do not necessarily correspond on a one-to-one basis with the pixels included in another frame. Technically, a block which is defined by one pixel in a certain frame and which is composed of a plurality of pixels including the one pixel is correlated with a block which is defined by one pixel in another frame and which is composed of a plurality of pixels including the one pixel in the other frame. Then, the motion vector whose start point and end point correspond to the coordinates of specific pixels defining the correlated blocks is determined. Note that motion vectors are not necessarily determined for all the pixels. There are some pixels whose motion vectors are not determined (e.g., motion vectors for pixels representing a background image to be newly displayed on a screen as a result of movement of an object cannot be determined, because the pixels are not correlated with pixels included in a previous frame). As described above in the explanation of the detection unit 11, when some conversion is executed on an input frame in the pre-stage of the detection unit 11, a pixel corresponding to a start point or an end point of a motion vector may be an erroneous pixel which is different from the correct pixel. In such a case, the motion vector is inappropriate as information for use in the motion compensation unit 14 and the correction unit 13, each of which is a subsequent-stage processing unit. Accordingly, the motion information generation unit 12 outputs a vector reliability which indicates the degree of reliability of each motion vector for use in the correction unit 13 and the motion compensation unit 14. The vector reliability is another example of the motion information 23 output by the motion information generation unit 12.

The correction unit 13 corrects the input signal 21 by using the motion information 23 according to the accuracy 22 detected by the detection unit 11, and outputs a correction signal 24. Specifically, pixels included in the unit of processing within one frame, for example, are first input to the correction unit 13 as the input signal 21. For instance, the correction unit 13 receives pixels included in a plurality of lines within one frame. When the input pixels include an erroneous pixel different from the correct pixel to be included in the one frame, the correction unit 13 performs correction such that the erroneous pixel different from the correct pixel to be included in the one frame is corrected to the pixel to be included in the one frame. Specifically, the correction unit 13 performs weighted averaging (i.e., correction) on pixels included in the corresponding processing unit of another frame, which is different from the one frame, and the input pixels, based on the motion vector for each of the input pixels and the accuracy 22 output by the detection unit 11. In this case, the correction unit 13 also performs necessary correction on the pixels included in the other frame. Specifically, when the other frame includes a pixel different from the correct pixel to be included in the other frame, the correction unit 13 performs correction such that the pixel different from the correct pixel to be included in the other frame is corrected to the pixel to be included in the other frame. Specific examples of the information to be subjected to weighted averaging include a signal value for characterizing each pixel, such as a value of a luminance signal or a color difference signal representing each pixel to be subjected to weighted averaging. Thus, the pixels input to the correction unit 13 are corrected based on the correct pixel information, as compared to the pixels before execution of the weighted averaging processing. Further, the correction unit 13 may perform weighted averaging based on the accuracy 22 or the vector reliability which is an example of the motion information 23 output by the motion information 12, or on both the accuracy 22 and the vector reliability. The weighted averaging is not performed on the pixels whose motion vectors are not determined. The correction unit 13 does not necessarily perform the correction depending on the value of the accuracy 22.

Then, the motion compensation unit 14 performs motion compensation on the correction signal 24 by using the motion information 23, and outputs an output signal 25. Specifically, the motion compensation unit 14 receives, as the correction signal 24, pixels included in the unit of processing of the one frame and pixels included in the unit of processing of another frame, which is different from the one frame, from the correction unit 13. In this case, when the correction unit 13 performs the correction on the one frame, the motion information generation unit 12 recalculates a motion vector which correlates the pixels forming the one frame with the pixels forming the other frame. This is because when the correction unit 13 performs the correction on the one frame, the motion vector generated by the motion information generation unit 12 may be a motion vector of low reliability which does not correlate the pixels accurately. If the motion vector of low reliability is used, pixels forming an interpolation frame cannot be generated accurately. For this reason, the motion information generation unit 12 recalculates a motion vector. The motion compensation unit 14 generates pixels included in an interpolation frame to be displayed between one frame and another frame, based on the received pixels and the pixels which are correlated by the motion vector and which are included in the unit of processing corresponding to another frame different from the one frame. The motion compensation unit 14 generates the pixels included in the interpolation frame as the output signal 25.

The detection unit 11, the motion information processing unit 12, the correction unit 13, and the motion compensation unit 14 repeat the above-mentioned processing for each processing unit defined in one frame. Accordingly, the above-mentioned processing is performed on all the pixels within one frame. Finally, the motion compensation unit 13 generates and outputs all pixels forming interpolation frames to be displayed between one frame and another frame (e.g., preceding frame) different from the one frame.

Figure 2:
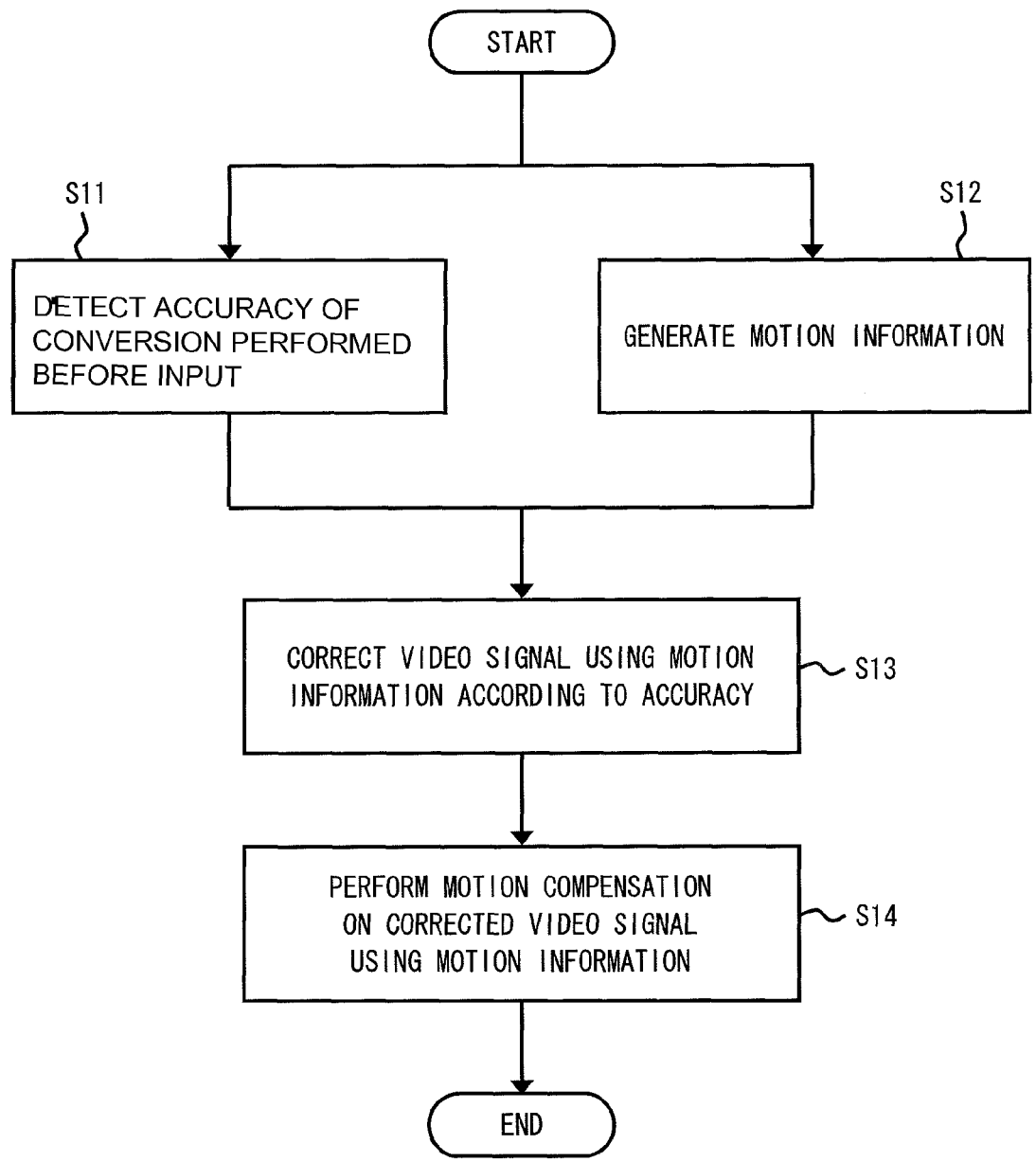
FIG. 2 is a flowchart showing a flow of a video signal processing method according to the first exemplary embodiment of the present invention.

FIG. 2 is a flowchart showing a flow of a video signal processing method according to the first exemplary embodiment of the present invention. First, the detection unit 11 detects the accuracy 22 of conversion before input of the input signal 21 (S11). The motion information generation unit 12 generates the motion information 23 (S12). Either one of steps S11 and S12 may be performed prior to the other.

Next, the correction unit 13 corrects a video signal by using the motion information 23 according to the accuracy 22 (S13). Then, the motion compensation unit 14 performs motion compensation on the corrected video signal by using the motion information 23 (S14).

Thus, even in the case where the input signal 21 has been incorrectly converted, the correction signal 24 can be generated by detecting the accuracy 22. Consequently, the accuracy of the output signal 25 can be improved by performing motion compensation on the correction signal 24.

[Second Exemplary Embodiment]

Figure 3:
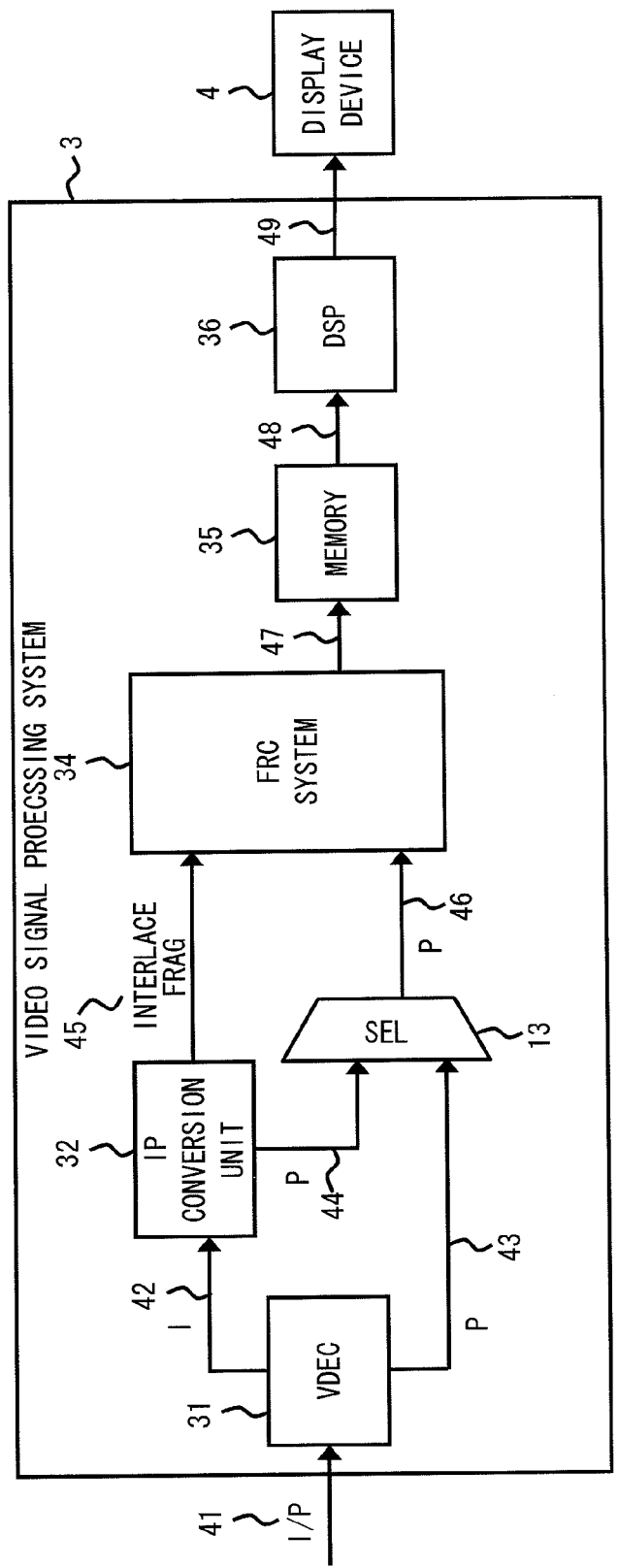
FIG. 3 is a block diagram showing an exemplary configuration of a video signal processing system according to a second exemplary embodiment of the present invention.

FIG. 3 is a block diagram showing an exemplary configuration of a video signal processing system 3 according to a second exemplary embodiment of the present invention. The video signal processing system 3 receives an input video signal 41 from an external device (not shown), performs a predetermined conversion processing, and outputs an output video signal 49 to a display device 4. The input video signal 41 is, for example, a moving image representing a target motion by sequentially displaying a plurality of frames in succession. The plurality of frames are sequentially input to the image processing system 3. The video signal processing system 3 can receive video signals from various external devices via input terminals (not shown). The video signal processing system 3 can accept both interlaced and progressive signals. The interlaced signal is a signal in which pixels in each line of a frame are sent by alternately scanning the odd-numbered lines and even-numbered lines, for example. The progressive signal is a signal in which all the pixels in the first to last lines are sequentially transmitted. Examples of the progressive signal to be input include a signal that is subjected to IP conversion in advance by an external device. The video signal processing system 3 outputs a progressive signal as the output video signal 49. The phrase "transmit a pixel" refers to transmission of a value of a signal for defining a certain pixel. Examples of the value of a signal for defining a certain pixel include values of signals such as Y, Cb, and Cr (luminance signal, color difference signal) and values of signals indicating color components such as R, G, and B.

The video signal processing system 3 includes a VDEC (Video Decoder) 31, an IP conversion unit 32, a selector 33, an FRC system 34, a memory 35, and a DSP (Digital Signal Processor) 36. Note that the configuration of the video signal processing system 3 is not particularly limited thereto, as long as the video signal processing system 3 includes at least the FRC system 34.

The VDEC 31 receives the input video signal 41 and analyzes the attribute of the input video signal 41, thereby determining whether the input signal is an interlaced signal or a progressive signal. Specifically, when the input video signal 41 is an analog signal, the VDEC 31 determines whether the input video signal is an interlaced signal or a progressive signal by analyzing a synchronous signal. When the input video signal 41 is a digital signal, the VDEC 31 determines whether the input video signal 41 is an interlaced signal or a progressive signal by referring to header information included in the input video signal 41. When determining that the input video signal 41 is an interlaced signal, the VDEC 31 outputs an interlaced signal 42 to the IP conversion unit 32. Meanwhile, when determining that the input video signal 41 is a progressive signal, the VDEC 31 outputs a progressive signal 43 to the selector 33.

The IP conversion unit 32 converts the received interlaced signal 42 into a progressive signal 44, and outputs the progressive signal 44 to the selector 33. More specifically, the IP conversion unit 32 interpolates a pixel in a missing line of a frame composed of pixels included in the received input interlaced signal 42, and then outputs the pixels of the frame, which has no missing line as a result of interpolation, in the order from the pixel included in the top line (i.e., outputs a progressive signal). The IP conversion unit 32 further outputs an interlace flag 45 to the FRC system 34. The interlace flag 45 is a signal indicating that the frame composed of pixels including the interlaced signal 42 has been subjected to IP conversion and the pixels included in the frame obtained through the IP conversion have been output as the progressive signal 44. That is, the interlace flag 45 is information for notifying that the IP conversion unit 32 has performed an IP conversion from the interlaced signal 42 to the progressive signal 44. For instance, upon execution of the IP conversion, the IP conversion unit 32 sets the interlace flag 45.

The selector 33 selects one of the progressive signal 43 and the progressive signal 44, and outputs the selected signal to the FRC system 34 as a progressive signal 46.

The FRC system 34 receives the interlace flag 45 and the progressive signal 46, performs a predetermined conversion processing, and outputs an output video signal 47 to the memory 35. The configuration and processing of the FRC system 34 will be described in detail later with reference to FIG. 4.

The memory 35 is a storage device that stores the output video signal 47. The memory 35 is preferably a RAM (Random Access Memory) or a flash memory, for example. The DSP 36 reads out the converted video signal stored in the memory 35 as an output video signal 48, and outputs the output video signal 48 to the display device 4 as the video signal 49.

Further, the display device 4 causes an output device, such as a screen, to display the output video signal 49 from the video signal processing system 3.

Figure 4:
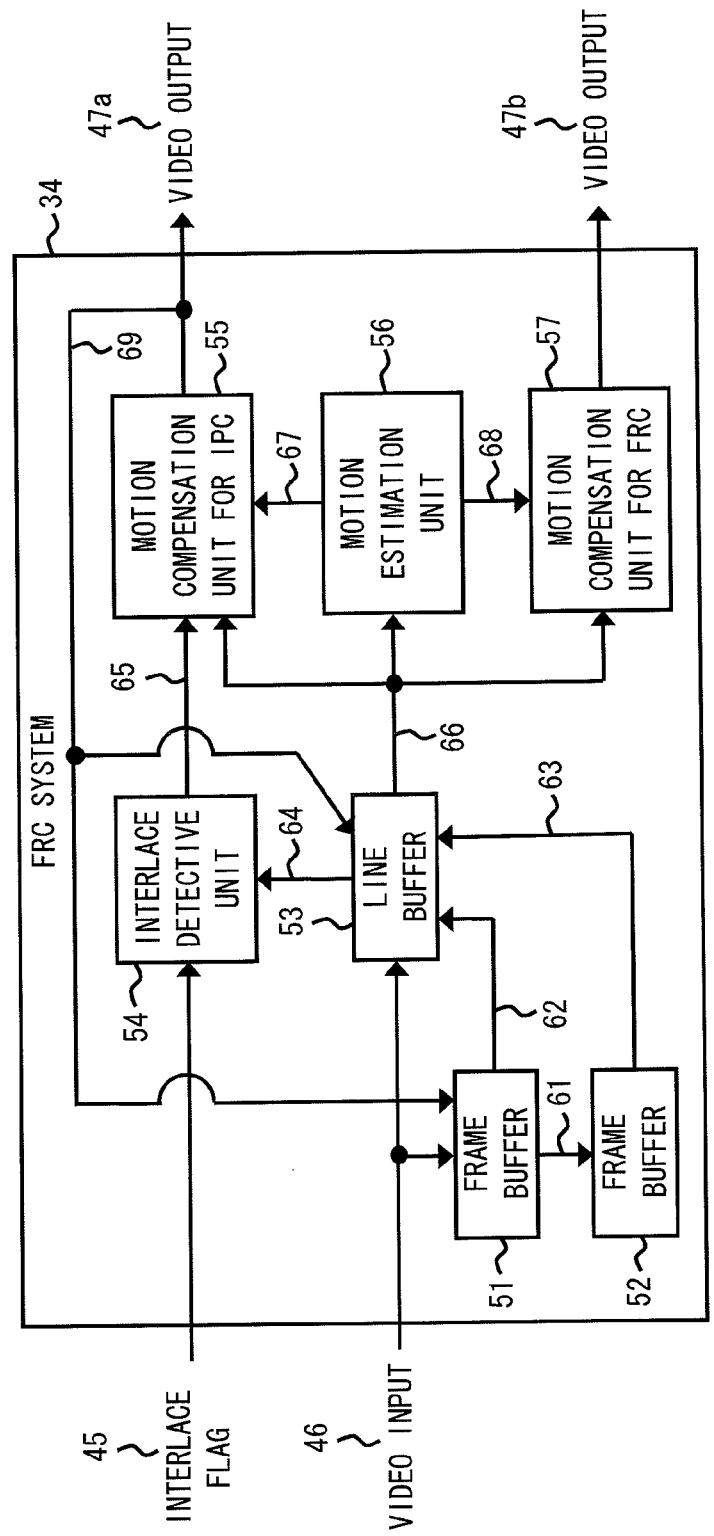
FIG. 4 is a block diagram showing an exemplary configuration of an FRC system according to the second exemplary embodiment of the present invention.

FIG. 4 is a block diagram showing an exemplary configuration of the FRC system 34 according to the second exemplary embodiment of the present invention. The FRC system 34 receives the interlace flag 45 and the progressive signal 46, performs a predetermined conversion processing, and outputs output video signals 47a and 47b. The FRC system 34 includes frame buffers 51 and 52, a line buffer 53, an interlace detective unit 54, a motion compensation unit for IPC 55, a motion estimation unit 56, and a motion compensation unit for FRC 57. The frame buffers 51 and 52 are provided so that the motion compensation unit for FRC 57, which is described later, can refer to three frames, instead of two frames, during a frame rate conversion. As the simplest way, the motion compensation unit for FRC 57 performs a frame rate conversion by referring to two frames. Accordingly, the frame rate conversion referring to two frames is be described below by way of example. In the second exemplary embodiment, the interlace detective unit 54 corresponds to the detection unit 11 of the first exemplary embodiment. The motion estimation unit 56 corresponds to the motion information generation unit 12 of the first exemplary embodiment. The motion compensation unit for IPC 55 corresponds to the correction unit 13 of the first exemplary embodiment. The motion compensation unit for FRC 57 corresponds to the motion compensation unit 14 of the first exemplary embodiment.

First, the FRC system 34 receives pixels included in one frame as the progressive signal 46 (specifically, a value of a signal for defining each pixel, such as a value of a luminance signal or a color difference signal). Assume that the frame to which pixels are currently input as the progressive signal 46 is a frame FB, and the frame which precedes the frame FB and in which pixels are input as the progressive signal 46 to the FRC system 34 is a frame FA. As described later, each of pixels forming the frame FA is subjected to correction by the motion compensation unit for IPC 55, if necessary. The frame buffer 51 stores information about signals indicating the pixels forming the frame FA. First, pieces of information ranging from information about a pixel included in a top line of the frame FB to information about a pixel included in a predetermined line are sequentially input to the FRC system 34. The number of lines from the top line to the predetermined line corresponds to the unit of processing of the FRC system 34. Herein, a plurality of lines are used as a unit of processing, for example. Pixels included in the lines of the unit of processing are stored in the line buffer 53.

Figure 5:
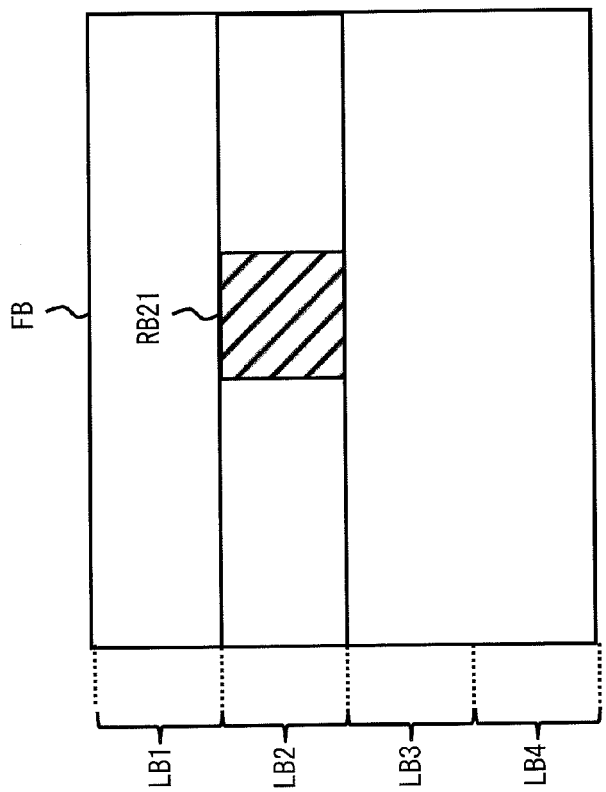
FIG. 5 is a diagram illustrating a relationship between a frame buffer and a line buffer according to the second exemplary embodiment of the present invention.
Figure 5:
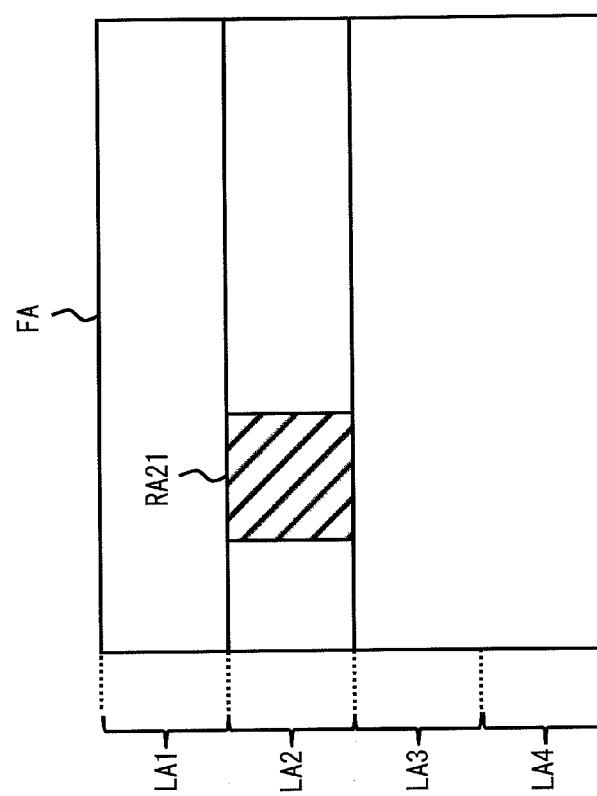

Meanwhile, the pixels forming the frame FA are output from the frame buffer 51 and are stored in the line buffer 53. Specifically, pixels corresponding to the pixels of the frame FB, which are stored in the line buffer 53, out of the pixels included in the frame FA are written into the line buffer 53. Referring now to FIG. 5, the relationship between the pixels and lines of the frames FA and FB stored in the line buffer 53 will be described. FIG. 5 shows that each of the frames FA and FB virtually includes four line groups each composed of a plurality of lines, for example. Specifically, the frame FA includes four line groups LA1, LA2, LA3, and LA4, and the frame FB includes four line groups LB1, LB2, LB3, and LB4. In the line group LA2 of the frame FA, for example, a certain pixel range RA21 is defined. Since the frames FA and FB represent moving images, it is possible that the pixel range RA21 of the frame FA moves to a pixel range RB21 in the subsequent frame FB. In this exemplary embodiment, the number of lines included in each of the line groups of the frames FA and FB is in the range of 20 to 60, for example. Additionally, in this exemplary embodiment, the line groups LA1 and LB1 have the same number of lines, for example. Similarly, the line groups LA2 and LB2, the line groups LA3 and LB3, and the line groups LA4 and LB4 have the same number of lines. The line groups LA1 to LA4 may have the same number of lines, and the line groups LB1 to LB4 may have the same number of lines. Assume herein that pixels included in the lines belonging to the line group LB1 of the frame FB are written into the line buffer 53 as the progressive signal 46, for example. Specifically, referring to FIG. 5, pixels included in a line located at the top of FIG. 5 within the line group LB1 are sequentially written into the line buffer 53 in the order from the left-end pixel to the right-end pixel. Then, pixels included in a line located below the top line within the line group LB1 are sequentially written into the line buffer 53 in the order from the left-end pixel to the right-end pixel. This process is repeated in a similar manner until all the pixels included in the line group LB1 are written into the line buffer 53. In this case, pixels included in the lines belonging to the line group LA1 of the frame FA are output from the frame buffer 51, and the output pixels are written into the line buffer 53.

Note that the remaining pixels of the frame FB are also written into the line buffer 53 depending on the progress of processing of the FRC system 34 which is described later. Further, the remaining pixels of the frame FA, which are stored in the frame buffer 51, are sequentially written into the line buffer 53 from the frame buffer 51 depending on the progress of processing of the FRC system 34 which is described later, and thus the line buffer 53 is overwritten with the pixels. Specifically, as described later, there is no need to store, in the line buffer 53, the pixels that have already been used by the motion compensation unit for FRC 57 to generate pixels forming an interpolation frame in the frame rate conversion. For instance, as described in detail below, the motion compensation unit for FRC 57 generates pixels necessary for an interpolation frame between the line group LA1 and the line group LB1 which is obtained after correction and which includes pixels subjected to correction as described below by the LPC motion compensation unit 55. Depending on the progress of this processing, there is no need to sequentially store the pixels of the line groups LB1 and LA1 in the line buffer 53. For instance, pixels of an interpolation frame are sequentially generated using the pixels of the line group LA1, which are determined by a motion vector, in the order from the left-end pixel to the right-end pixel in the top line of the line group LB1. Next, pixels in a line located below the top line are processed in a similar manner. If this process is repeated sequentially, there is no need to store the pixels of the line group LB in the line buffer 53 in the order from the pixel included in the uppermost line to the pixels included in the lowermost line.

Meanwhile, each of the pixels of the frame FB is input to the FRC system 34 as a progressive signal. Accordingly, the pixels belonging to the line group LB2 are sequentially input to the line buffer 53 in the order from the left-end pixel in the uppermost line of the line group LB2. Then, the pixels which belong to the line group LB1 and which are not required to be stored in the line buffer 53 are sequentially overwritten by the input pixels belonging to the line group LB2, in the order from the left-end pixel in the uppermost line of the line group LB1 of the line buffer 53.

Further, when an interpolation frame is generated by frame rate conversion, the pixels of the line group LA1 corresponding to the pixels of the line group LB1 are also used, and there is no need to store the pixels belonging to the line group LA1 in the line buffer 53. At the time when the generation of the pixels of the interpolation frame using the pixels of the line group LB1 is completed, the pixels of the line group LA1 stored in the line buffer 53 become unnecessary. Specifically, if the pixels of the line group LA1, which are determined by a motion vector, have already been used, the pixels need not be stored. Further, motion vectors are not necessarily determined on a one-to-one basis between the pixels of the line group LA1 and the pixels of the line group LB1. Therefore, it is not necessary to store the remaining pixels that are not used to form the interpolation frame. In short, at the time when the generation of the interpolation frame using the pixels of the line group LB1 is completed, it is not necessary to store any of the pixels of the line group LA1 stored in the line buffer 53.

Until the generation of the pixels of the interpolation frame using the pixels of the line group LB1 is completed, the pixels are stored in the line buffer 53. However, the pixels of the line group LA1, which are not required any more, are overwritten by the pixels included in the line group LA2, as needed. Then, when the generation of the pixels of the interpolation frame using the pixels of the line group LB1 is completed, the pixels included in the line group LA1 may be overwritten by all the pixels included in the line group LA2 in the line buffer 53.

After that, all the pixels belonging to the line group LB2 are stored in the line buffer 53, and all the pixels belonging to the line group LA2 are also stored in the line buffer 53.

As described later, the pixels of the frame FA, which have been once written into the line buffer 53 from the frame buffer 51, need not be stored in the frame buffer 51. For this reason, a storage area in which the line group read from the frame buffer 51 is written is overwritten with the pixels of the frame FB which are received as the progressive signal 46. This process will be described in detail below with reference to the example shown in FIG. 5. First, as the pixels belonging to the line group LB1 of the frame FB are sequentially written into the line buffer 53 in the order from the top line, the pixels belonging to the line group LA1 of the frame buffer 51 are also sequentially written into the line buffer 53 in the order from the top line. Thus, the pixels which belong to the line group LA1 and which are stored in the frame buffer 51 are sequentially determined as unnecessary to be stored, in the order from the top line. Accordingly, the pixels, which are determined as unnecessary to be stored, out of the pixels belonging to the line group LA1 which are stored in the frame buffer 51 simultaneously with those pixels, are overwritten by the pixels written into the line buffer 53 of the line group LB1 of the frame FB. Additionally, as described above, the pixels belonging to the line group LA2 are sequentially output from the frame buffer 51 and written into the line buffer 53 depending on the progress of processing for forming the interpolation frame by the motion compensation unit for FRC 57 which is described later. This eliminates the need to sequentially store, in the frame buffer 51, the pixels belonging to the line group LA2 of the frame buffer 51. When the pixels in the top line of the line group LB2 of the frame FB are to be written into the frame buffer 51, there is no need to store any of the pixels in the vicinity of the top line of the line group LA2 of the frame buffer 51, and thus the pixels may be overwritten. The formation of the pixels of the interpolation frame in the frame rate conversion is carried out, while the pixels are sequentially used in the order from the pixel in the top line of the line group LB1. Also, the pixels of the line group LA1, which are determined by a motion vector, usually correspond to the pixels in the vicinity of the top line of the line group LA1 because of the continuity of the target motion. This is because also the pixels of the line group LA2, which are stored in the frame buffer 51, are sequentially output to the line buffer 53 in the order from the pixel in the vicinity of the top line of the line group LA2, and sequentially overwrite the pixels in the vicinity of the top line of the line group LA1. Therefore, the pixels of the line group LA2 of the frame buffer 51 are sequentially overwritten by the pixels belonging to the line group LB2 of the frame FB in the order from the pixel in the top line.

In this manner, the pixels move between the line buffer 53 and the frame buffer 51. The line groups LA1, LA2, LB1, and LB2 of the frames FA and FB are described above by way of example. Likewise, the pixels of each frame sequentially move also in the subsequent processing depending on the processing state.

As described above, the frame buffer 52 is necessary for the motion compensation unit for FRC 57 to perform the frame rate conversion by referring to the pixels forming each of three frames. When the motion compensation unit for FRC 57 refers to the pixels forming each of the three frames, pixels forming a frame FC (e.g., preceding frame) which precedes the frame FA are stored. The frame FC also includes line groups each having a plurality of lines, for example, and the pixels belonging to the line group corresponding to the line group LB1 of the frame FB are output to the line buffer 53 from the frame buffer 52 and are written into the line buffer 53. In the case where the motion compensation unit for FRC 57 performs the frame rate conversion by referring to the three frames, the pixels of the frame FB, which are currently input to the FRC system 34, are written into the frame buffer 52 storing the frame FC which is two frames before the frame FB. Thus, the input frame and the frames stored in each of the frame buffers 51 and 52, i.e., the frames corresponding to three time periods are constantly formed. Accordingly, the motion compensation unit for FRC 57 can perform the frame rate conversion by referring to the three frames.

Even when the frame rate conversion is performed using the two frames, control for writing and reading of the frame buffer 51 and the line buffer 53 is extremely complicated as described above. This may make it difficult to control timing of reading and writing. In such a case, the frame buffer 52 may be introduced when the frame rate conversion is carried out using two frames, to thereby facilitate the control of reading and writing. When the frame buffer 51 stores the frame FA, for example, pixels are output from the frame buffer 51 to the line buffer 53. Meanwhile, the pixels of the frame FB are written into the frame buffer 52. That is, when the frame FB is input to the FRC system 34, the frame buffer 51 is used as a read-only buffer and the frame buffer 52 is used as a write-only buffer. This avoids the complication of the timing control for reading and reading required between the line buffer 53 and the frame buffer 51 as described above.

In the above exemplary embodiment, a specific example has been described in which, among the line groups as units of processing, the pixels belonging to the line group LB1 of the frame FB are written into the line buffer 53 as a progressive signal. After that, the pixels belonging to the line group LB1 of the frame FB are corrected by the motion compensation unit for IPC 55, which is described later, and the pixels of the line group LB1 stored in the frame buffer 51 are overwritten by the corrected pixels. Further, the pixels of the line group LB1 which are stored in the line buffer 53 are overwritten by the pixels of the line group LB1 of the frame FB which are corrected by the motion compensation unit for IPC 55. Then, the pixels thus obtained are read out and used by the motion compensation unit for FRC 57 which is described later. The motion compensation unit for FRC 57 also reads out the pixels belonging to the line group LA1, which are stored in the line buffer 53, from the line buffer 53, and uses the read pixels to carry out the frame rate conversion. After that, the pixels stored in the frame buffer 51 and the line buffer 53 are updated in the manner as described above, and all the pixels of the frame FB are processed using the pixels of the frame FA.

By repeating the process as described above, the processing according to this exemplary embodiment is performed on all the lines of the frame FB. As for the frame buffer 51, the frame FA is first stored in the frame buffer 51, and thereafter the pixels of the frame FB are sequentially written thereinto, with the result that the frame FB is finally stored in the frame buffer 51.

Thus, the line buffer 53 is a buffer for storing values of a luminance signal and the like that define each pixel existing in a part of lines of a frame. The line buffer 53 obtains and stores pixel data corresponding a plurality of lines to be corrected as a unit of correction processing in a frame to be processed. As described above, the number of lines to be corrected is in the range of 20 to 60, for example, but is not limited thereto. Herein, the line buffer 53 obtains the pixel data corresponding to the lines to be corrected from the progressive signal 46 and stores the pixel data thus obtained. At the same time, the line buffer 53 obtains line data 62 and 63, which are pixel data respectively corresponding to the lines to be corrected, from the frame buffer 51 or from each of the frame buffers 51 and 52 depending the number of frames to be referred to by the motion compensation unit for FRC 57, and stores the line data 62 and 63 thus obtained.

Returning to FIG. 4, the interlace detective unit 54 analyzes line data 64 obtained from the line buffer 53, and detects whether the interlaced signal is converted. In accordance with the above exemplary embodiment, the interlace detective unit 54 first reads out and obtains information about the pixels belonging to the line group LB1 of the frame FB from the line buffer 53. Then, the interlace detective unit 54 detects the accuracy of IP conversion to be performed on the frame FB in the pre-stage of the FRC system 34, from the information about the pixels belonging to the line group LB1. Accordingly, the interlace detective unit 54 analyzes whether one pixel interpolated by the IP conversion is correctly interpolated, based on the similarity or correlation between a frequency component of a luminance signal of the one pixel interpolated as a result of the IP conversion, and a frequency component of a luminance signal of each of the pixels, which are the original pixels that are originally transmitted and have no missing pixel and which are located around the one pixel, out of the input pixels of the line group LB1. If not only a frequency of a luminance signal but also a frequency of a color difference signal is analyzed, the analysis accuracy is further improved. However, this leads to an increase in circuit size and processing time. There are other various methods for the analysis, and as will be understood by those skilled in the art, the present invention is not limited to the method described above.

The interlace detective unit 54 performs similar processing on all the other pixels interpolated as a result of the IP conversion. Then, the interlace detective unit 54 calculates the ratio of incorrectly interpolated pixels to the whole pixels of the line group LB1 as the unit of processing. After that, the interlace detective unit 54 outputs the ratio as the accuracy of IP conversion. For example, the higher ratio indicates a lower accuracy of IP conversion performed on the pixels of the line group LB1 of the frame FB. Meanwhile, the lower ratio indicates a higher accuracy of the IP conversion. The interlace detective unit 54 outputs the accuracy of the IP conversion to the motion compensation unit for IPC 55 as conversion intensity information 65. As specific examples of the conversion intensity information 65, various forms may be used. For example, a 2-bit value may be used. In this case, when no correction is necessary because the accuracy of IP conversion is high or because the progressive signal 46 is originally supplied as a progressive signal, the conversion intensity information 65 may be set to "00". When the correction is necessary because the accuracy of IP conversion is low, the conversion intensity information 65 may be set to "01", "10", and "11" to be correlated in this order according to the lowness of the accuracy. Note that the method for representing the conversion intensity information 65 is not limited thereto.

The interlace detective unit 54 calculates information quantitatively indicating the ratio of pixels erroneously subjected to IP conversion to the whole pixels of the line group LB1, as information necessary for the motion estimation unit 56, which is described later, to calculate a parameter of a vector reliability. There are various possible methods for calculating this information. For instance, the information is calculated based on the correlation between a frequency component of a luminance signal of a pixel erroneously subjected to IP conversion, and a frequency component of a luminance signal of each of the original pixels which are located around the pixel and are not subjected to interpolation.

While the processing for the pixels existing in the line group LB1 of the frame FB is described above, similar processing is thereafter performed on the pixels belonging to the line groups LB2, LB3, and LB4 which are input to the line buffer 53.

In the above exemplary embodiment, the processing for the pixels in the line group LB1 of the frame FB is described by way of example. To sum up in a general manner, the interlace detective unit 54 may analyze the input video signal to detect a degree of an interpolation error as the accuracy of conversion before input. For instance, the interlace detective unit 54 compares a plurality of lines in a frame, thereby detecting the degree of the interpolation error as the accuracy of conversion before input. More specifically, the interlace detective unit 54 may analyze frequencies of an original line and an interpolation line to detect the degree of the interpolation error based on the similarity and correlation between waveforms or the like, and may set the intensity according to the detected degree. Alternatively, the interlace detective unit 54 may compare a plurality of frames to detect the degree of the interpolation error as the accuracy of conversion before input. More alternatively, the interlace detective unit 54 may set the conversion intensity information 65 in such a manner that the interlace detective unit 54 analyzes frequencies from luminance signals of a plurality of frames and determines the similarity therebetween, to thereby detect the degree of the interpolation error based on the similarity, correlation, or the like between waveforms, and determines the intensity according to the detected degree of the interpolation error. In other words, the interlace detective unit 54 is determination means that determines whether to perform correction on the input progressive signal according to the accuracy of IP conversion in the input progressive signal.

It is desirable for the interlace detective unit 54 to detect the accuracy of conversion before input, based on a signal indicating that the input video signal has been converted from the interlaced signal. In this case, the interlace detective unit 54 receives the interlace flag 45. When the interlace flag 45 is set, the conversion intensity information 65 is set to a value indicating that the accuracy of IP conversion is high, and is output to the motion compensation unit for IPC 55. When the interlace flag 45 is set, the interlace detective unit 54 does not necessarily analyze the line data 64. This is because the conversion accuracy is secured, since it is indicated that the IP conversion has been performed by the IP conversion unit 32 incorporated in the video signal processing system 3.

The motion estimation unit 56 performs motion estimation processing based on line data 66. Specifically, prior to correction by the motion compensation unit for IPC 55, the motion estimation unit 56 outputs the motion vector and the vector reliability, which are the results of the processing, to the motion compensation unit for IPC 55 as motion information 67. After the correction by the motion compensation unit for IPC 55, the motion estimation unit 56 determines a motion vector again by using the corrected pixels so as to supply the motion vector with high accuracy for use in execution of the frame rate conversion, and outputs the motion vector to the motion compensation unit for FRC 57 as motion information 68. This is described in detail below. To facilitate the explanation, the frame FA and the frame FB are described by way of example. First, the pixels belonging to the line group LA1 of the frame FA and the pixels belonging to the line group LB1 of the frame FB are stored in the line buffer 53. The motion estimation unit 56 reads out each of the pixels belonging to the line group LB1 and each of the pixels belonging to the line group LA1 from the line buffer 53. Then, the motion estimation unit 56 determines a motion vector for each of the read pixels. If it is possible to determine to which pixel among the pixels belonging to the line group LB1 one pixel belonging to the line group LA1 moves, a vector connecting the coordinates of the pixels can be determined as the motion vector. The one pixel belonging to the line group LA1 is a start point of the motion vector in this case, and one pixel belonging to the line group LB1 is an end point of the motion vector. Meanwhile, as described in the first exemplary embodiment, it is often impossible to determine one motion vector only by correlating the pixels. This is because a plurality of destination pixel candidates for one pixel belonging to the line group LA1 are found in the pixels belonging to the line group LB1 in many cases. In such a case, an analysis is made to determine to which block in the pixels of the line group LB1 a certain range of blocks including one pixel belonging to the line group LA1 and pixels located around the one pixel correspond. If the corresponding block can be found in the pixels of the line group LB1, the one pixel in the block of the line group LB1 can be determined as the end point of the motion vector. Thus, it is possible to easily determine one movement destination of the pixel of the line group LA1 among the pixels of the line group LB1. Further, the possibility of determining one motion vector for each pixel of the line group LA1 and the line group LB1 can be increased. In this manner, the motion estimation unit 56 tries to determine the motion vector whose end point corresponds to any one of the pixels of the line group LB1, for all the pixels of the line group LA1. The value of the coordinate of the motion vector thus determined is output to the motion compensation unit for IPC 55 and is used for correction to be described later. Meanwhile, as for the pixels whose motion vectors are not determined, the coordinates of the motion vectors are not output.

As described below, the motion estimation unit 56 also calculates information of a vector reliability. The vector reliability is a value indicating how correctly the one motion vector specifies a motion of a pixel. In this exemplary embodiment, the end point of the determined motion vector may be a pixel that has not been corrected by the motion compensation unit for IPC 55, even through the pixel is erroneously subjected to IP conversion at this time. There is a possibility that the motion vector of the pixel whose end point has been erroneously subjected to IP conversion and which has not been corrected cannot specify the motion of the pixel correctly. For this reason, the motion estimation unit 56 of this exemplary embodiment calculates the vector reliability for each of the determined motion vectors. First, the motion estimation unit 56 obtains, from the interlace detective unit 54, the information calculated by the interlace detective unit 54, i.e., the information indicating the degree of error in a pixel erroneously subjected to IP conversion among pixels belonging to the line group LB1 of the frame FB. Alternatively, when the interlace detective unit 54 does not calculate the information, the motion estimation unit 56 may calculate the information. Then, when the pixel corresponding to the coordinate of the end point of the determined motion vector is a pixel erroneously subjected to IP conversion, the motion estimation unit 56 sets the value of the vector reliability indicating the reliability of the motion vector based on quantitative information indicating the degree of error in the pixel. The less a signal value representing the brightness of a pixel or the like at an end point of the motion vector is correlated, as compared with the original pixels located around the pixel, for example, the greater the degree of error becomes. Thus, the reliability of the motion vector whose end point corresponds to the pixel is determined to be low. The motion estimation unit 56 sets the value of the vector reliability to each of the determined motion vectors, and outputs the value to the motion compensation unit for IPC 55 as the motion information 67.

In the above exemplary embodiment, the case has been described in which the motion vector is determined using the pixels belonging to the line group LA1 and the pixels belonging to the line group LB1. After that, the motion estimation unit 56 performs similar processing on the subsequent lines such as the line groups LA2, LB2, LA3, and LB3, thereby determining the motion vector and the vector reliability. The motion vector and the vector reliability, which are determined in the above processing, are information necessary for the motion compensation unit for IPC 55 to perform correction as described below. The motion compensation unit for FRC 57 needs to perform frame rate conversion with higher accuracy, and thus needs to use the motion vector which is determined using the corrected pixel.

In the above processing, the start point of the motion vector is not taken into consideration in the calculation of the vector reliability. This is because the pixel serving as the start point has already been corrected by the ICP motion compensation unit 55.

The motion compensation unit for IPC 55 corrects the video signal, i.e., the pixel input from the line buffer 53 based on the conversion intensity information 65 detected by the interlace detective unit 54 and on the motion information 67 which indicates the motion vector and the vector reliability and which is received from the motion estimation unit 56. To simplify the processing, the pixel input from the line buffer 53 may be corrected based on at least the motion vector and the conversion intensity information 65 without taking the vector reliability into consideration. However, in the following description, an example using the conversion intensity information 65, the motion vector, and the vector reliability will be described. Note that the motion compensation unit for IPC 55 outputs the corrected pixel as a correction signal 69 and also as the output video signal 47a, and stores the signals to the memory 35.

Motion compensation is a technique that compensates for these motions in inter-frame prediction. Specifically, in the case of predicting a current frame (frame at an interpolation position), prediction is performed using frames before and after the current frame. To carry out motion compensation, a motion vector obtained by motion estimation (ME) for estimating an amount of motion of an image. That is, motion compensation is a technique that interpolates frames before and after the current frame according to a motion vector, and performs compensation for the current frame. The motion compensation unit for IPC 55 and the motion compensation unit for FRC 57 to be described later according to the second exemplary embodiment can carry out motion compensation processing by using the motion information 67 and 68, which are output by the motion estimation unit 56, as the motion vector. The processing will be described below by using specific examples of the frames FA and FB in the same manner as above.

First, the motion compensation unit for IPC 55 reads out and obtains information about each pixel belonging to the line group LA1 of the frame FA stored in the line buffer 53, and information about each pixel belonging to the line group LB1 of the frame FB stored in the line buffer 53, from the line buffer 53. Further, as described above, the motion compensation unit for IPC 55 receives, as coordinate information, motion vectors whose start point corresponds to each pixel of the line group LA1 and whose end point corresponds to any one of the pixels of the line group LB1, from the motion estimation unit 56. The motion compensation unit for IPC 55 also obtains the value of the vector reliability for each motion vector.

Figure 6:
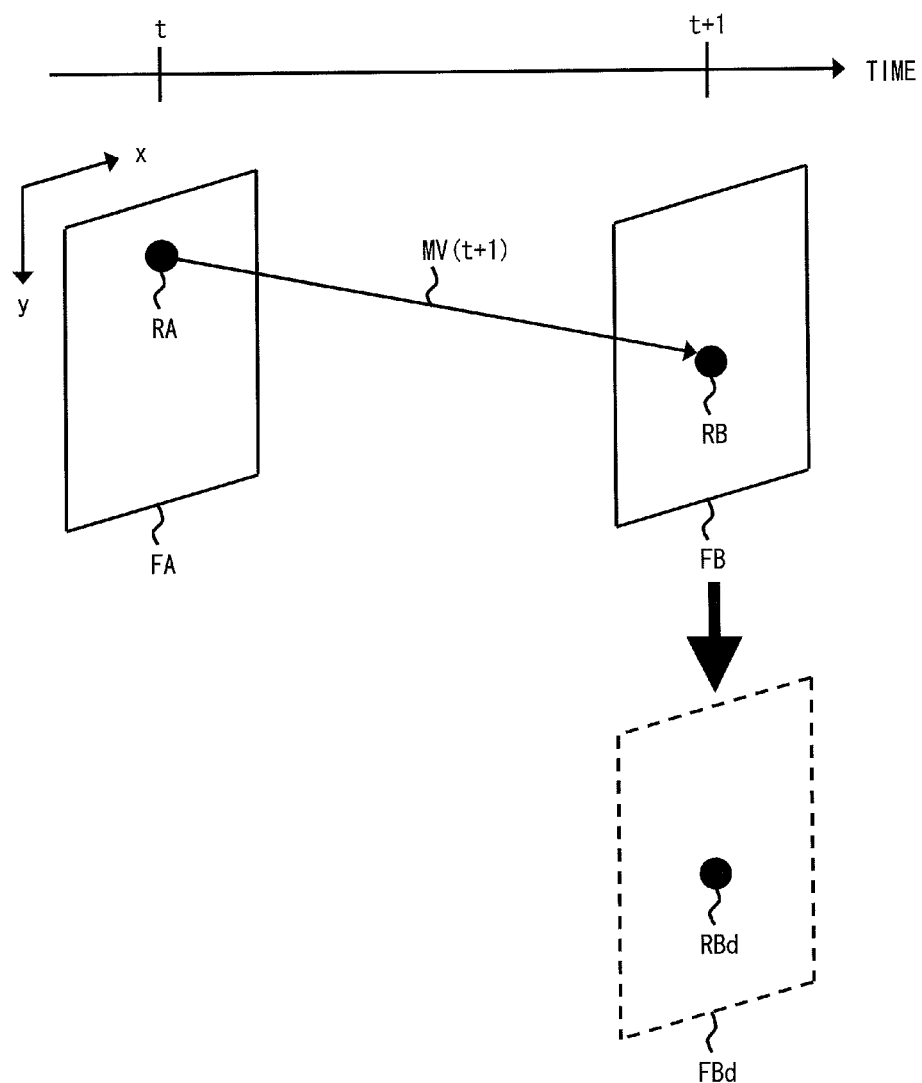
FIG. 6 is a diagram illustrating the concept of correction for IPC according to the second exemplary embodiment of the present invention.

Referring to FIG. 6, the processing of the motion compensation unit for IPC 55 will be described in detail. FIG. 6 is a diagram illustrating the concept of correction for IPC according to the second exemplary embodiment of the present invention. The horizontal axis in FIG. 6 represents a flow of time. Herein, the frame at time t+1 corresponds to the frame FB which is a frame to be currently processed. The frame at time t corresponds to the frame FA. The pixels forming the frame FA have already been subjected to necessary correction. To facilitate illustration of a motion vector MV(t+1) in FIG. 6, a pixel RA of the frame FA and a pixel RB of the frame FB as shown in FIG. 6 are significantly deviated in the y-direction in FIG. 6. In practice, assume that the pixel RA of the frame FA is one pixel belonging to the line group LA1, and the pixel RB of the frame FB belongs to the line group LB1. The motion vector MV(t+1) is a motion vector generated by the motion estimation unit 56 described above. As described earlier, a frame which is not required to be corrected or a frame which has already been corrected may be used as the frame FA, since the accuracy of the IP conversion performed thereon is high. The frame FB needs to be corrected, since the accuracy of the IP conversion performed thereon is low. Assume that when the frame FA has already been corrected, a corrected frame FAd is used.

First, the motion compensation unit for IPC 55 converts the conversion intensity information 65 into a correction coefficient "g". For instance, a conversion table from the conversion intensity information 65 to the correction coefficient "g" (e.g., a value in the range of 0 to 1) is preferably predefined. In the conversion table, the conversion intensity information 65 indicating "00" may be correlated with the correction coefficient "g" of "0"; "01" may be correlated with "0.3"; "10" may be correlated with "0.6"; and "11" may be correlated with "1.0", for example. When the conversion intensity information 65 on the frame FB is "10", for example, the correction coefficient "g" is "0.6". Assume therein that a vector reliability received from the motion estimation unit 54 is represented by "h". Further, the motion compensation unit for IPC 55 extracts the value of the vector reliability of the motion vector MV(t+1) connecting the pixel RA of the frame FA and the pixel RB of the frame FB shown in FIG. 6 from the values of the vector reliability received from the motion estimation unit 56. Assuming herein that a signal value (e.g., a value of a luminance signal or a color difference signal) indicating the pixel RA of the frame FA is PA and a signal value indicating the pixel RB of the frame FB is PB, the motion compensation unit for IPC 55 carries out calculation given by the following formula (1).

$$PB'=(1-gh)PB+ghPA \qquad (1)$$

PB' in the formula (1) represents a value of a pixel belonging to a frame RBd shown in FIG. 6, i.e., a frame obtained after correcting the frame FB. That is, PB' represents a value of a pixel RBd obtained as a result of correcting the pixel RB of the frame FB by the formula (1).

The motion compensation unit for IPC 55 performs the processing represented by the formula (1) on all pixels specified by motion vectors among the pixels included in each of the line group LA1 of the frame FA and the line group LB1 of the frame FB1. Then, the motion compensation unit for IPC 55 overwrites the pixel of the line group LB1 stored in the line buffer 53 with the signal value indicating the corrected pixel belonging to the line group LB1 thus obtained. Similarly, the motion compensation unit for IPC 55 overwrites the pixel of the line group LB1 stored in the frame buffer 51 with the signal value indicating the corrected pixel. Further, the motion compensation unit for IPC 55 outputs the pixels of the line group LB1 including the corrected pixel as the output video signal 47a. The output pixels are written into the memory 35 shown in FIG. 3.

The processing performed by the motion compensation unit for IPC 55 using the pixels of each of the line group LA1 and the line group LB1 has been described in detail above. Similar processing is carried out also for the line groups LA2 and LB2, the line groups LA3 and LB3, and the line groups LA4 and LB4. By repeating the processing as described above, the necessary correction is performed on the pixels in all the lines of the frame FB. As a result, the frame buffer 51 stores the corrected frame RBd.

Next, the operation of the motion compensation unit for FRC 57 will be described. The motion compensation unit for FRC 57 is a processing unit that executes frame rate conversion. Also in this case, the operation will be described using specific examples of the frame FA and the line group LA1. First, the motion compensation unit for FRC 57 obtains, from the line buffer 53, the pixels belonging to the line group LA1 of the frame FA and the corrected pixels belonging to the line group LB1 which are corrected by the motion compensation unit for IPC 55 and overwritten in the line buffer 53. At this time, the motion estimation unit 56 also reads out the pixels belonging to the line group LA1 and the corrected pixels belonging to the line group LB1. In this case, motion vectors are necessary for frame rate conversion. However, the motion vectors determined by the motion estimation unit 56 are determined in the state where the pixels of the line group LB1 are not subjected to necessary correction. Hence, the motion vectors may include ones with low vector reliability, and the motion vectors of low reliability are not suitably used for the frame rate conversion. This is because pixels of an interpolation frame are most likely to be formed using the motion vectors incapable of correctly specifying the motion of each pixel, so that it is highly possible that a correct interpolation frame cannot be formed. Accordingly, the motion estimation unit 56 determines a motion vector again for each of the pixels of the line group LA1 and for the corrected pixels of the line group LB1 in a similar manner as described above. Then, information indicating the determined motion vector, such as the coordinates of the start point and the end point of the vector, is output to the motion compensation unit for FRC 57.

The motion compensation unit for FRC 57 executes frame rate conversion using the motion vectors which are determined by the motion estimation unit 56 for each of the pixels belonging to the line group LA1 and each of the corrected pixels belonging to the line group LB1. Specifically, first, the motion compensation unit for FRC 57 specifies, from one motion vector, one pixel belonging to the line group LA1 and one pixel belonging to the line group LB1 after correction. Then, the motion compensation unit for FRC 57 generates an interpolation pixel at a coordinate on a segment connecting the coordinate of the specified one pixel of the line group LA1 and the coordinate of the specified one pixel belonging to the line group LB1 after correction. A middle point of a line segment connecting two pixels may be a representative example of the coordinate of the interpolation pixel. To generate the interpolation pixel, one of signal values indicating two pixels specified by the motion vector may be directly used as the value of the signal indicating the interpolation pixel, or the signal values indicating the two pixels may be averaged. When the middle point of the two pixels specified by the motion vector is used as the coordinate of the interpolation pixel as described above, a frame to be displayed at an intermediate time between the display time of the frame FA and the display time of the frame FB after correction is generated as the interpolation frame. The motion compensation unit for FRC 57 carries out the above processing in units of pixels on the pixels specified based on all the motion vectors determined between the line group LA1 and the line group LB1 after correction.

In determining motion vectors, the pixels included in the frame FA do not necessarily correspond on a one-to-one basis with the pixels included in the frame FB. Accordingly, not all the pixels forming interpolation frames can be generated by the above processing. The pixels that cannot be generated by the above processing may be generated by copying a predetermined pixel of one of frames to be referred to, for example.

Similarly, the subsequent line groups, such as the line group LA2 and the line group LB2 after correction, are sequentially processed, and finally, all the lines are subjected to the same processing as described above. The motion compensation unit for FRC 57 outputs the pixels processed as described above as the output video signal 47b, and stores the output video signal 47b to the memory 35. As a result, the interpolation frame to be interpolated between the frame FA and the frame FB after correction is generated and stored in the memory 35.

Thus, in the frame rate conversion, it is necessary to specify pixels corresponding to a start point and an end point by a motion vector. In the related art, the motion vector defines a pixel erroneously subjected to IP conversion as an end point or a start point. Accordingly, even though an interpolation pixel is generated based on the motion vector to generate an interpolation frame, there is a possibility that an image displayed by the interpolation frame is different from the correct interpolation result. Meanwhile, according to this exemplary embodiment of the present invention, the motion vector is determined between the frames obtained as a result of correcting the pixel erroneously subjected to IP conversion, thereby making it possible to determine the motion vector with higher accuracy than in the related art. This increases the possibility that the image displayed by the interpolation frame generated by frame rate conversion shows the correct interpolation result. That is, this solves the problem of the related art.

Figure 7:
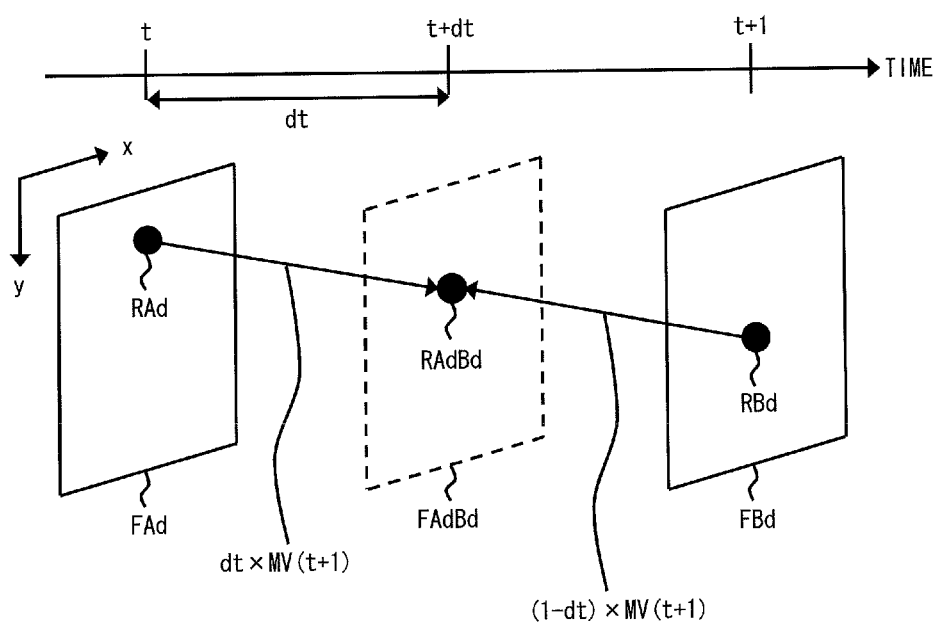
FIG. 7 is a diagram illustrating the concept of motion compensation for FRC according to the second exemplary embodiment of the present invention.

FIG. 7 is a diagram illustrating the concept of motion compensation for FRC according to the second exemplary embodiment of the present invention. The horizontal axis in FIG. 7 represents a flow of time. Assume herein that when the frame to be currently processed is the corrected frame RBd at time t+1, the frame preceding the frame at time t+1 is the corrected frame FAd at time t. Also assume that a ratio at which the corrected frame FAd and the corrected frame RBd are combined is a difference time dt. In the case of FRC, the difference time dt may be preferably set to "0.5", for example. In this case, assuming that a corrected frame at time t+1 according to a motion vector MV is represented by Fdmv(t+1) and a corrected frame at time t according to the motion vector MV is represented by Fdmv(t), a frame Fc(t) obtained after motion compensation by the motion compensation unit for FRC 57 can be calculated by the following formula (2).

$$Fc(t+dt)=(1-dt) \times Fdmv(t-1)+dt \times Fdmv(t) \qquad (2)$$

In the example shown in FIG. 7, Fc (t+dt) in the formula (2) represents a corrected frame FAdBd. That is, a pixel RAdBd of the corrected frame FAdBd is determined based on the pixel FAd of the corrected frame FAd and the pixel RBd of the corrected frame RBd.

In general, the processing cost of the motion estimation unit 56 is high. The term "processing cost" herein described refers to a circuit size or a processing time. In the second exemplary embodiment, for example, the motion vector required by the motion compensation unit for IPC 55 and the motion vector required by the motion compensation unit for FRC 57 are commonly output by the motion estimation unit 56, thereby suppressing an increase in the circuit size which is one example of the processing cost.

When the progressive signal 46 has not been subjected to IP conversion, it is necessary for the motion compensation unit for IPC 55 to perform any correction on the line data 66. Since the progressive signal 46 is originally a progressive signal of high accuracy, the processing time, which is one example of the processing cost, can be suppressed by omitting the correction. Also when the progressive signal 46 has been subjected to IP conversion with high accuracy, it is not necessary for the motion compensation unit for IPC 55 to perform any correction on the line data 66. In these cases, the motion compensation unit for IPC 55 outputs the progressive signal 46 as the output video signal 47a.

Further, when no correction has been made by the motion compensation unit for IPC 55, the motion compensation unit for FRC 57 receives a video signal at the time of input as the line data 66, and carries out motion compensation. In this case, the accuracy of the output video signal 47b can be set to a high level, as usual.

The motion compensation unit for IPC 55 and the motion compensation unit for FRC 57 may be implemented by the same circuit that switches processing by time division. This results in suppression of the circuit size.

In this way, the interlace detective unit 54 according to the second exemplary embodiment determines whether the input video signal has been converted from the interlaced signal by IP conversion, based on the information externally supplied or the analysis result of the input video signal. Then, the motion compensation unit for IPC 55 detects a corrupted area generated by IP conversion, thereby making it possible to carry out correction with high accuracy on the input progressive signal according to the motion vector which has been generated by the motion estimation unit 56. The motion compensation unit for FRC 57 carries out motion compensation on the corrected video signal, thereby improving the image quality of the entire frame output by the FRC system 34.

Figure 8:
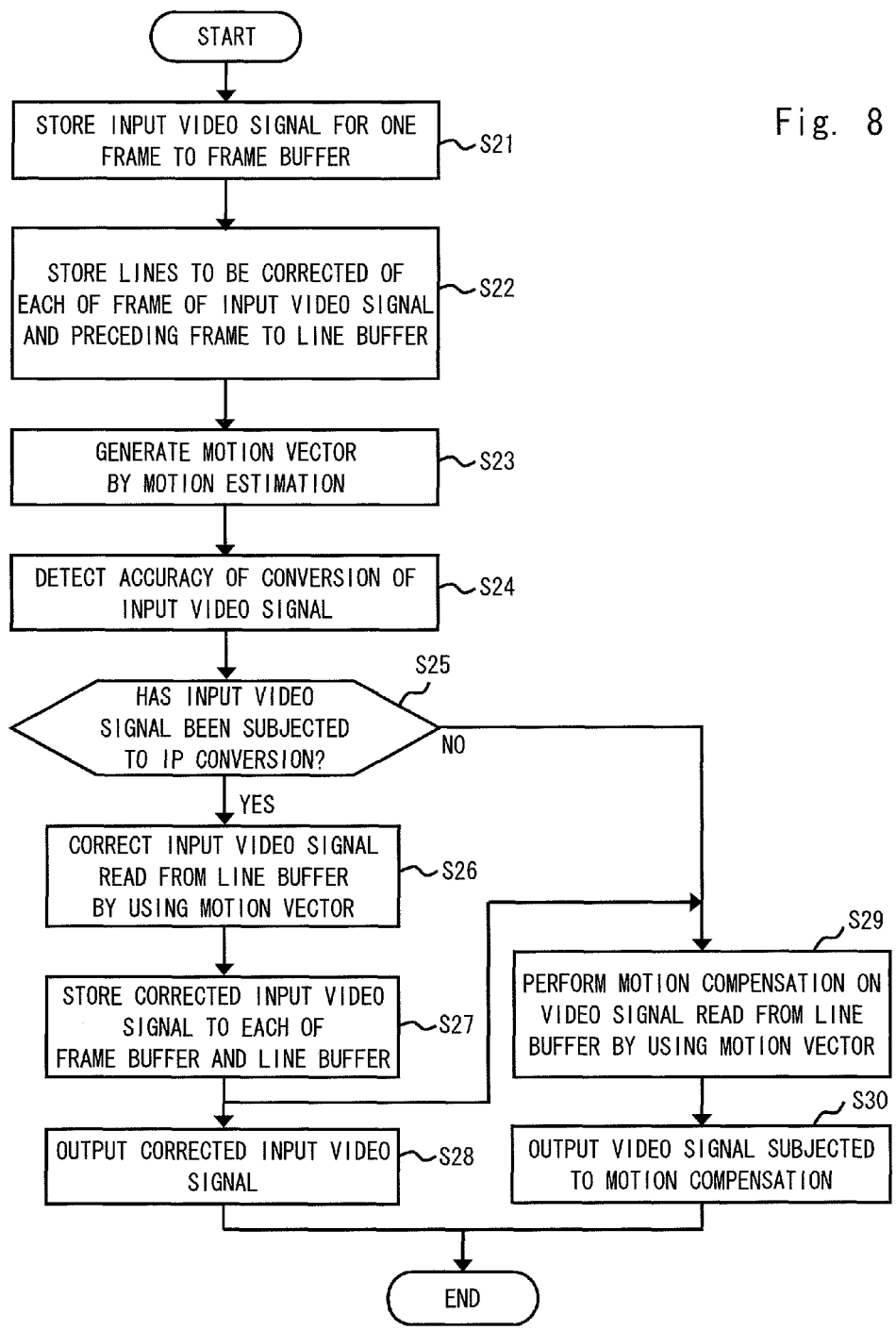
FIG. 8 is a flowchart showing a flow of a video signal processing method according to the second exemplary embodiment of the present invention.

FIG. 8 is a flowchart showing a flow of a video signal processing method according to the second exemplary embodiment of the present invention. First, the FRC system 34 stores the input video signal for one frame to the frame buffer 51 (S21). Next, the FRC system 34 stores, to the line buffer, lines to be corrected in the frame of the input video signal and in the preceding frame (S22). Then, the motion estimation unit 56 generates a motion vector by motion estimation (S23).

The interlace detective unit 54 detects the accuracy of the conversion of the input video signal (S24). The sequence of steps S23 and S24 is not limited to this. The interlace detective unit 54 determines whether the input video signal has already been subjected to IP conversion (S25). When determining that the input video signal has already been subjected to IP conversion, the motion compensation unit for IPC 55 corrects the input video signal read from the line buffer by using the motion vector (S26). Then, the motion compensation unit for IPC 55 stores the input video signal thus corrected to the frame buffer and the line buffer (S27). After that, the motion compensation unit for IPC 55 outputs the input video signal thus corrected (S28).

Meanwhile, when determining that the input video signal has not been subjected to IP conversion in step S25, or after step S27, the motion compensation unit for FRC 57 carries out motion compensation on the video signal read from the line buffer by using the motion vector (S29). Then, the motion compensation unit for FRC 57 outputs the video signal subjected to motion compensation (S30).

Figure 9:
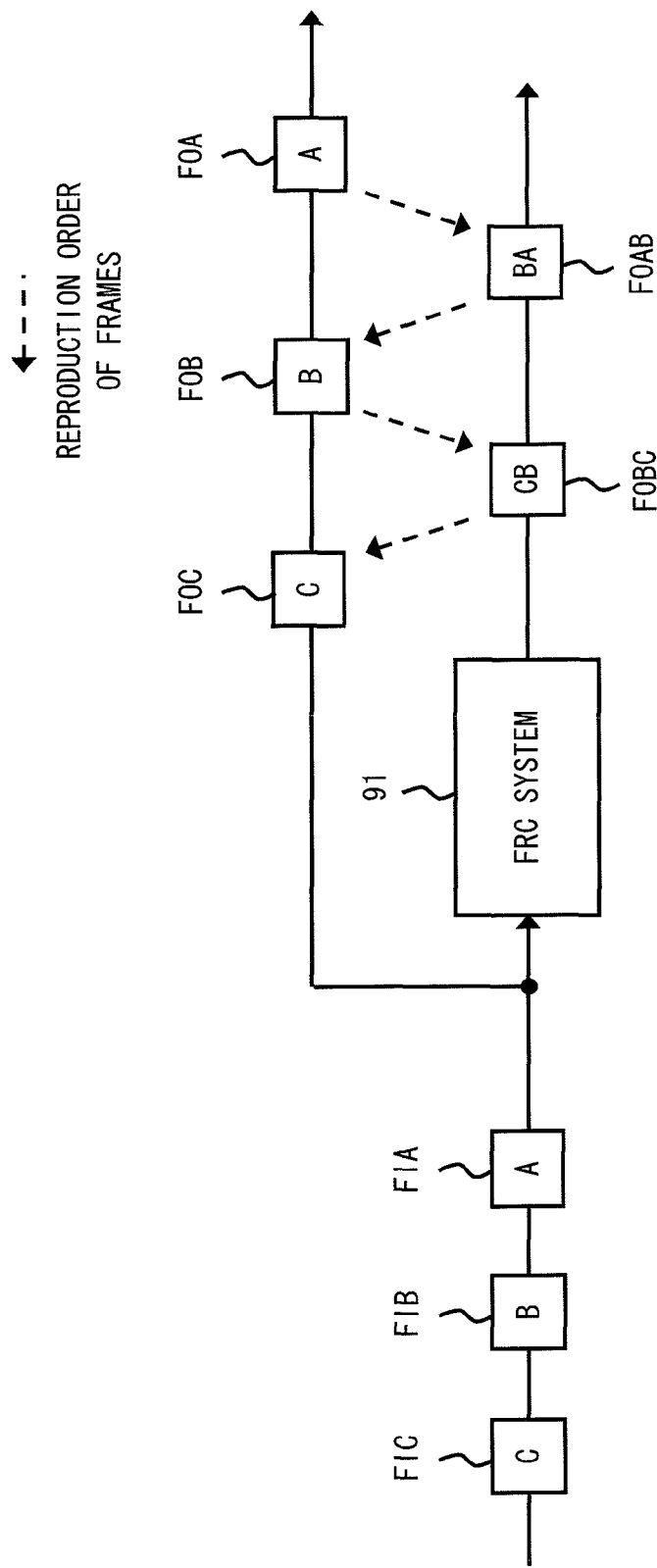
FIG. 9 is a diagram illustrating the principle of output and reproduction of a video in an FRC system.

FIG. 9 is a diagram illustrating the principle of image output and reproduction in the FRC system. An FRC system 91 shown in FIG. 9 is an exemplary system for processing an input video signal at a double rate. The FRC system 91 is used in, for example, Japanese Unexamined Patent Application Publication No. 2008-118505. The FRC system 91 receives video signals in the order of frames FIA, FIB, and FIC, and outputs corrected frames FOAB and FOBC in this order as a result of frame rate conversion. While the frames FIA, FIB, and FIC are input to the FRC system 91, the frames FIA, FIB, and FIC are directly output as frames FOA, FOB, and FOC in this order without being converted. The frames are reproduced in the order of FOA, FOAB, FOB, FOBC, and FOC. In this case, when the frame FIB, which is an input video signal, has been erroneously subjected to IP conversion, the FRC system 91 carries out motion compensation on the corrected frames FOAB and FOBC with an incorrect state. Thus, at the time of reproduction, three frames out of the five frames become incorrect frames, resulting in an increase of the incorrect state.

Figure 10:
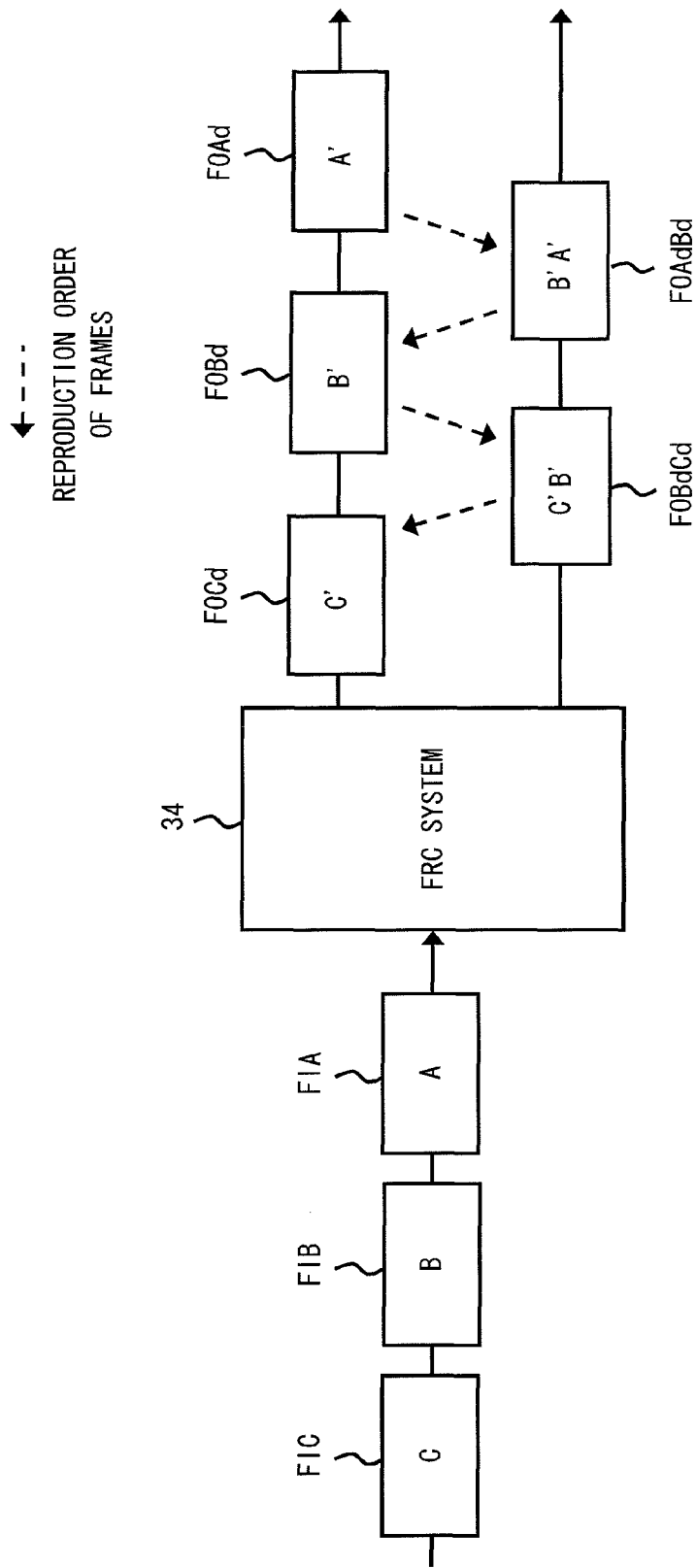
FIG. 10 is a diagram illustrating an example of output and reproduction of a video in an FRC system according to the second exemplary embodiment of the present invention.

FIG. 10 is a diagram illustrating an example of image output and reproduction in the FRC system 34 according to the second exemplary embodiment of the present invention. The FRC system 34 receives video signals in the order of the frames FIA, FIB, and FIC, and carries out the predetermined conversion processing as described above. First, the motion compensation unit for IPC 55 corrects the frames FIA, FIB, and FIC, and outputs corrected frames FOAd, FOBd, and FOCd in this order. Further, the motion compensation unit for FRC 57 carries out motion compensation on the corrected frames FOAd, FOBd, and FOCd, and outputs corrected frames FOAdBd and FOBdCd in this order. The frames are reproduced in the order of FOAd, FOAdBd, FOBd, FOBdCd, and FOCd. In this case, when the frame FIB of the input video signal has been erroneously subjected to IP conversion, the interlace detective unit 54 detects the error, and the motion compensation unit for IPC 55 corrects the frame FIB and outputs the corrected frame as the corrected frame FOBd. Further, the motion compensation unit for FRC 57 combines the corrected frames FOAdBd and FOBdCd by using the corrected frame FOBd in which the error has been corrected. Thus, the error in the output of the FRC system 34 has already been corrected. This improves the accuracy for the three input frames shown in FIG. 10.

According to the second exemplary embodiment, the amount of calculation for motion detection does not increase. This is because the motion estimation unit 56 included in the FRC system 34 is equivalent to that included in the FRC system 91 or the like, and thus it is not necessary to provide an additional component. Moreover, according to the second exemplary embodiment, both the suppression of occurrence of a failure in the IP conversion and the improvement in the interpolated image quality of the FRC system referring to the IP conversion result can be achieved at low additional cost.

[Third Exemplary Embodiment]

A third exemplary embodiment of the present invention is an exemplary embodiment in which the motion compensation unit for FRC 57 included in the FRC system 34 according to the second exemplary embodiment is replaced with a motion compensation unit for MJC (Movie Judder Cancellation) 57*a*. The MJC, which is one type of motion compensation, is a technique that displays 120 images of 24 movie films per second, thereby achieving a smooth display of motions without causing a unique jumpy motion. The configuration and operation of the third exemplary embodiment may be similar to of those of the second exemplary embodiment, so the detailed description and illustration thereof are omitted.

Figure 11:
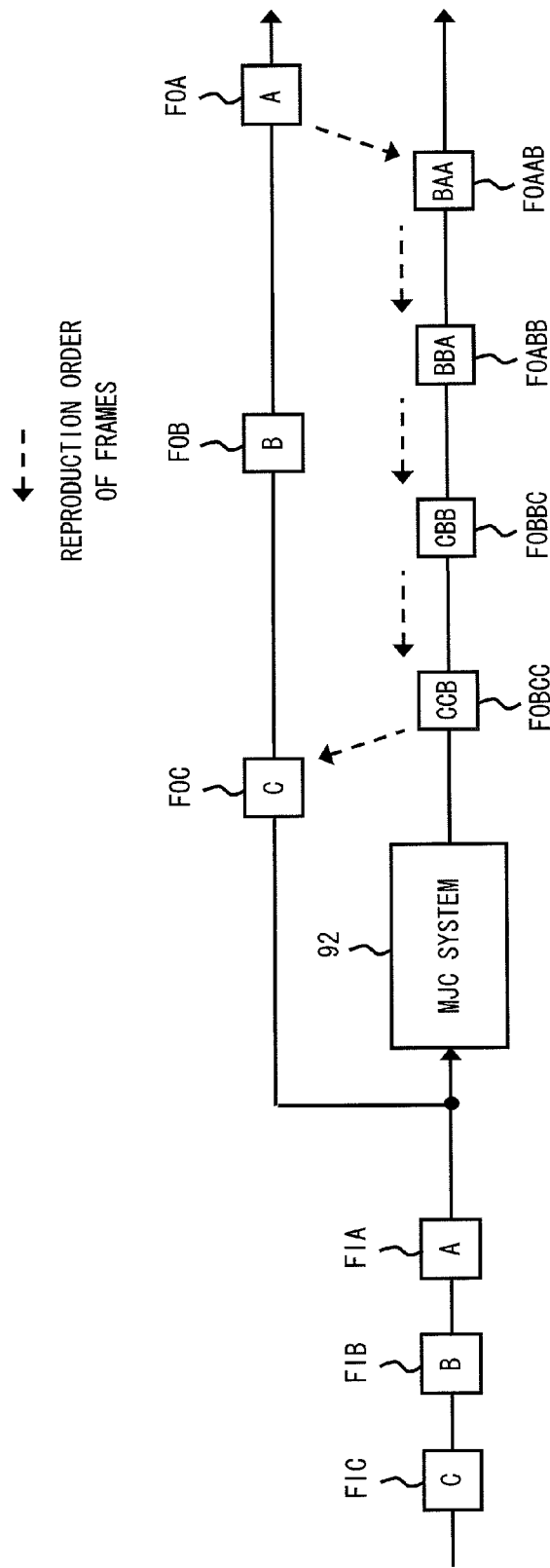
FIG. 11 is a diagram illustrating the principle of output and reproduction of a video in an MJC system.

FIG. 11 is a diagram illustrating the principle of image output and reproduction in an MJC system. An MJC system 92 shown in FIG. 11 is an exemplary system for performing MJC processing on an input video signal. The MJC system 92 receives video signals in the order of the frames FIA, FIB, and FIC, and outputs corrected frames FOAAB, FOABB, FOBBC, and FOBCC in this order as a result of the MJC processing. While the frames FIA, FIB, and FIC are input to the MJC system 92, the frames FIA, FIB, and FIC are directly output as the frames FOA, FOB, and FOC in this order without being converted. The frames are reproduced in the order of FOA, FOAAB, FOABB, FOBBC, FOBCC, and FOC. In this case, when the frame FIB, which is an input video signal, has been erroneously subjected to IP conversion, the MJC system 92 carries out motion compensation on the corrected frames FOAAB, FOABB, FOBBC, and FOBCC with an incorrect state. Thus, at the time of reproduction, four frames out of the six frames become incorrect frames, resulting in an increase of the incorrect state.

Figure 12:
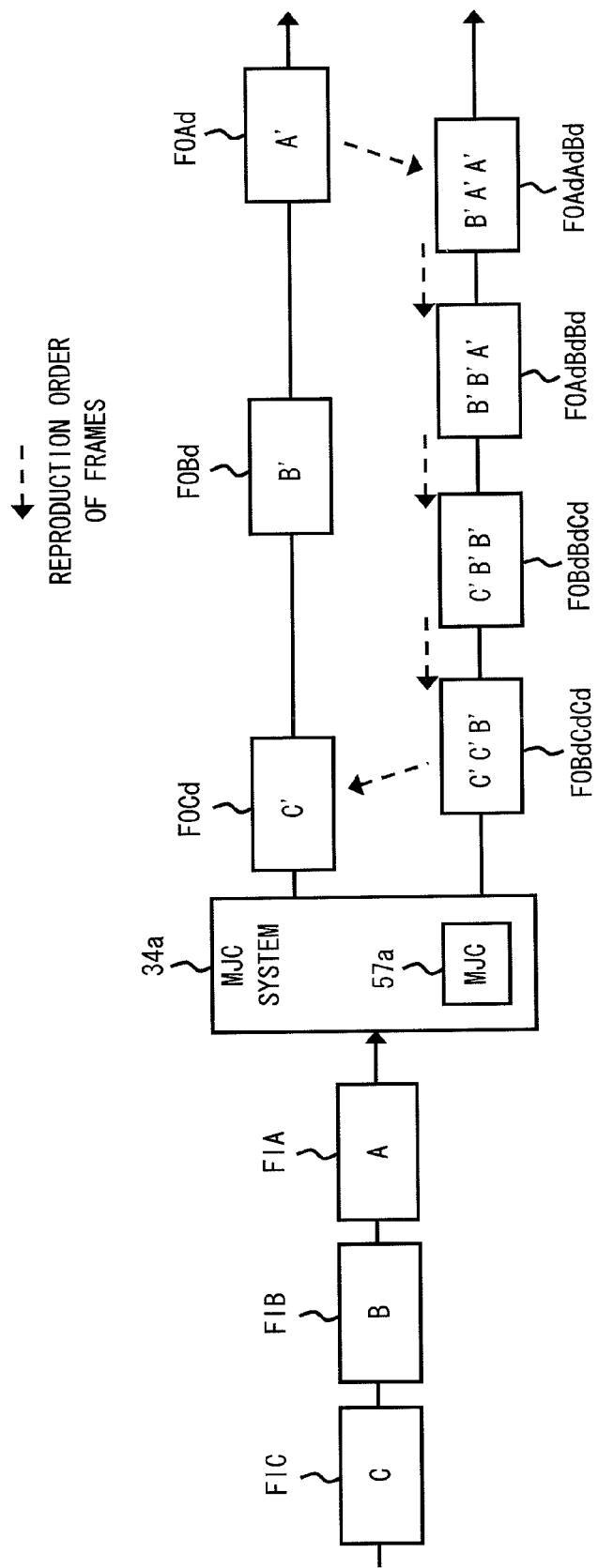
FIG. 12 is a diagram illustrating an example of output and reproduction of a video in an MJC system according to a third exemplary embodiment of the present invention.

FIG. 12 is a diagram illustrating an example of image output and reproduction in an MJC system 34*a* according to the third exemplary embodiment of the present invention. The MJC system 34*a* receives video signals in the order of the frames FIA, FIB, and FIC, and carries out the predetermined conversion processing in which the FRC processing is replaced with the MJC processing. First, the motion compensation unit for IPC 55 corrects the frames FIA, FIB, and FIC, and outputs the corrected frames FOAd, FOBd, and FOCd in this order. Further, the motion compensation unit for MJC 57*a* carries out motion compensation on the corrected frames FOAd, FOBd, and FOCd. In this case, the difference time dt is varied as 0.4, 0.8, 1.2, and 1.6. Thus, the motion compensation unit for MJC 57*a* outputs corrected frames FOAdAdBd, FOAdBdBd, FOBdBdCd, and FOBdCdCd in this order. The frames are reproduced in the order of FOAd, FOAdAdBd, FOAdBdBd, FOBdBdCd, FOBdCdCd, and FOCd. In this case, when the frame FIB, which is an input signal, has been erroneously subjected to IP conversion, the interlace detective unit 54 detects the error, and the motion compensation unit for IPC 55 corrects the frame FIB and outputs the corrected frame as the corrected frame FOBd. Furthermore, the motion compensation unit for MJC 57*a* combines the corrected frames FOAdAdBd, FOAdBdBd, FOBdBdCd, and FOBdCdCd by using the corrected frame FOBd in which the error has been corrected. Thus, the error in the output of the MJC system 34*a* has already been corrected. This improves the accuracy for the three input frames shown in FIG. 12.

[Other Exemplary Embodiments]

In general, in the FRC system that performs frame rate conversion processing, a progressive signal is used as an input signal. Accordingly, in order to allow the FRC system to process the interlaced signal, the interlaced signal is usually converted into a progressive signal by IP conversion as preprocessing.

However, the IP conversion is out of range of operation of the FRC system. Thus, the performance of the IP conversion is not secured. The progressive signal subjected to IP conversion as preprocessing may contain an interpolation error such as flicker, comb, or an isolated point, for example.

Particularly when the IP conversion employed as preprocessing is an IP conversion of MP type, the cost of which is lower, an interpolation error due to the IP conversion is more liable to occur. On the contrary, when an IP conversion of motion compensation type is used as the IP conversion, which is employed as preprocessing, so as to reduce an interpolation error due to the IP conversion, the cost thereof increases.

Further, when the FRC system carries out motion vector detection processing on an image containing an interpolation error due to the IP conversion or noise due to a transmission path, a motion vector to be detected is incorrect. This causes a problem that the interpolation result of the FRC system is incorrect.

Therefore, in the first to third exemplary embodiments, motion compensation is carried out after an error is corrected, thereby suppressing occurrence of an incorrect state and improving the accuracy.

The present invention is not limited to the above exemplary embodiments, but may be modified in various manners without departing from the scope of the present invention described above. For instance, in the above exemplary embodiments, the present invention has been exemplified as a hardware configuration, but the present invention is not limited thereto. Any processing of the present invention can also be implemented by causing a CPU (Central Processing Unit) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first, second and third exemplary embodiments can be Combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A video signal processing device comprising:
a correction unit which performs correction such that when a first frame to be displayed at a first time includes a pixel different from a pixel to be included in the first frame, the pixel different from the pixel to be included in the first frame is corrected to the pixel to be included in the first frame, and which performs correction such that when a second frame to be displayed at a second time prior to the first time includes a pixel different from a pixel to be included in the second frame, the pixel different from the pixel to be included in the second frame is corrected to the pixel to be included in the second frame;
a motion compensation unit which generates an interpolation frame to be displayed at an intermediate time between the first time and the second time by referring to each of the first frame and the second frame; and
a detection unit that calculates a ratio of difference between a predetermined number of pixels forming the first frame and pixels to be included in the first frame.

2. The video signal processing device according to claim 1, wherein the correction unit performs the correction on the pixels included in the first frame based on the ratio.

3. The video signal processing device according to claim 2, further comprising:
a motion information generation unit calculates a motion vector for specifying which pixel among pixels forming the second frame corresponds to a pixel among pixels forming the first frame, and a vector reliability indicating a reliability of the motion vector specified, and outputs the motion vector and the vector reliability to the correction unit,
wherein the correction unit performs the correction on the pixels included in the first frame also based on the motion vector and the vector reliability.

4. The video signal processing device according to claim 3, wherein the correction unit performs weighted averaging on a signal value indicating one pixel forming the first frame and a signal value indicating one pixel forming the second frame based on the ratio and the vector reliability, the one pixel forming the second frame being correlated with the one pixel forming the first frame by the motion vector.

5. The video signal processing device according to claim 3, wherein the motion information generation unit further calculates a motion vector for specifying which pixel among pixels forming the second frame corresponds to a pixel among pixels forming the first frame including a pixel corrected by the correction unit, and outputs the motion vector to the motion compensation unit.

6. A video signal processing method comprising:
performing correction such that when a first frame to be displayed at a first time includes a pixel different from a pixel to be included in the first frame, the pixel different from the pixel to be included in the first frame is corrected to the pixel to be included in the first frame;
performing correction such that when a second frame to be displayed at a second time prior to the first time includes a pixel different from a pixel to be included in the second frame, the pixel different from the pixel to be included in the second frame is corrected to the pixel to be included in the second frame;
generating an interpolation frame to be displayed at an intermediate time between the first time and the second time by referring to each of the first frame and the second frame; and
calculating a ratio of difference between a predetermined number of pixels forming the first frame and pixels to be included in the first frame.

7. The video signal processing method according to claim 6, further comprising:
calculating a first motion vector for specifying which pixel among pixels forming the second frame corresponds to a pixel among pixels forming the first frame; and
calculating, when the correction is performed on pixels included in the first frame, a second motion vector for specifying which pixel among the pixels forming the first frame corresponds to a pixel among the pixels forming the second frame.

8. The video signal processing method according to claim 7, wherein the interpolation frame is generated using the second motion vector.

9. The video signal processing method according to claim 6, wherein the correction is performed on the pixels included in the first frame based on the ratio.

10. The video signal processing method according to claim 7, further comprising calculating a reliability of the first motion vector.

11. A non-transitory computer readable medium storing a video signal processing program for causing a computer to execute the processings of:
performing correction such that when a first frame to be displayed at a first time includes a pixel different from a pixel to be included in the first frame, the pixel different from the pixel to be included in the first frame is corrected to the pixel to be included in the first frame;
performing correction such that when a second frame to be displayed at a second time prior to the first time includes a pixel different from a pixel to be included in the second frame, the pixel different from the pixel to be included in the second frame is corrected to the pixel to be included in the second frame;
generating an interpolation frame to be displayed at an intermediate time between the first time and the second time based on each of the first frame and the second frame; and execute a detection processing of calculating a ratio of difference between a predetermined number of pixels forming the first frame and pixels to be included in the first frame.

12. The non-transitory computer readable medium storing the video signal processing program according to claim 11, further causing the computer to execute the processings of:
   calculating a first motion vector for specifying which pixel among pixels forming the second frame corresponds to a pixel among pixels forming the first frame; and
   calculating, when the correction is performed on pixels included in the first frame, a second motion vector for specifying which pixel among the pixels forming the first frame corresponds to a pixel among the pixels forming the second frame.

13. The non-transitory computer readable medium storing the video signal processing program according to claim 12, wherein the interpolation frame is generated using the second motion vector.

14. The non-transitory computer readable medium storing the video signal processing program according to claim 11, wherein the correction process is performed on the pixels included in the first frame based on the ratio.

15. The non-transitory computer readable medium storing the video signal processing program according to claim 14, further causing the computer to execute a motion information generation processing of calculating a motion vector for specifying which pixel among pixels forming the second frame corresponds to a pixel among pixels forming the first frame, and a vector reliability indicating a reliability of the motion vector specified, and outputting the motion vector and the vector reliability to the correction unit,
   wherein the correction processing is performed on the pixels included in the first frame also based on the motion vector and the vector reliability.

* * * * *